(12) United States Patent
Park et al.

(10) Patent No.: US 12,028,717 B2
(45) Date of Patent: Jul. 2, 2024

(54) ELECTRONIC DEVICE FOR PROVIDING DIGITAL ID INFORMATION AND METHOD THEREOF

(71) Applicant: Samsung Electronics Co., Ltd., Gyeonggi-do (KR)

(72) Inventors: Nahyeong Park, Gyeonggi-do (KR); Shinyoung Na, Gyeonggi-do (KR); Wonseok Baek, Gyeonggi-do (KR); Junsuk Oh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 17/570,538

(22) Filed: Jan. 7, 2022

(65) Prior Publication Data

US 2022/0201492 A1 Jun. 23, 2022

Related U.S. Application Data

(63) Continuation of application No. PCT/KR2021/019639, filed on Dec. 22, 2021.

(30) Foreign Application Priority Data

Dec. 22, 2020 (KR) .................. 10-2020-0180496

(51) Int. Cl.
*H04L 9/40* (2022.01)
*H04W 12/03* (2021.01)
(Continued)

(52) U.S. Cl.
CPC ......... *H04W 12/71* (2021.01); *H04L 63/0861* (2013.01); *H04W 12/03* (2021.01); *H04W 12/63* (2021.01)

(58) Field of Classification Search
CPC ..... H04W 12/71; H04W 12/63; H04W 12/03; H04L 63/0861
See application file for complete search history.

(56) References Cited

U.S. PATENT DOCUMENTS 9,721,147 B1\* 8/2017 Kapczynski ......... G06Q 50/265
10,616,226 B2 4/2020 Borunda et al.
(Continued)

FOREIGN PATENT DOCUMENTS

KR 10-2014-0029067 A 3/2014
KR 10-1583514 B1 1/2016
(Continued)

OTHER PUBLICATIONS

International Search Report dated Apr. 4, 2022.
(Continued)

*Primary Examiner* — Stephen T Gundry
(74) *Attorney, Agent, or Firm* — Cha & Reiter, LLC

(57) ABSTRACT

An electronic device and method are disclosed. The electronic device includes a secure element, a sensor module, a wireless communication module, a memory and processor. The processor implements the method, including receiving a signal from an external electronic device via the wireless communication module, determining identity information utilized for a service provided by an external electronic device, based on the received signal, authenticating a user using user authentication information received via the sensor module, based on successful authentication of the user, retrieving the identity information from a digital identification (ID) stored in the secure element, and transmitting the retrieved identify information to an authentication server, receiving an authentication confirmation for the identity
(Continued)

information from the authentication server, and transmitting the authentication information to the external electronic device.

20 Claims, 23 Drawing Sheets

(51) Int. Cl.
*H04W 12/63* (2021.01)
*H04W 12/71* (2021.01)

(56) References Cited

U.S. PATENT DOCUMENTS

| | | | |
|---|---|---|---|
| 11,206,258 B2 | 12/2021 | Ericson | |
| 2012/0303269 A1* | 11/2012 | Kim | G08G 1/0969 |
| | | | 701/461 |
| 2014/0115673 A1* | 4/2014 | Haynes | G06F 21/32 |
| | | | 726/5 |
| 2015/0257004 A1* | 9/2015 | Shanmugam | H04W 12/065 |
| | | | 455/411 |
| 2016/0092376 A1 | 3/2016 | Kim et al. | |
| 2019/0089693 A1* | 3/2019 | Ding | G06F 21/44 |
| 2019/0370781 A1* | 12/2019 | Van Os | G06F 9/451 |
| 2020/0082370 A1 | 3/2020 | Yang | |
| 2020/0275274 A1 | 8/2020 | Kwon et al. | |
| 2021/0049585 A1 | 2/2021 | Bienfait | |
| 2021/0105265 A1* | 4/2021 | Yang | H04W 12/047 |
| 2021/0256102 A1* | 8/2021 | Luft | H04L 63/045 |
| 2022/0109561 A1* | 4/2022 | Yang | B60R 25/33 |
| 2022/0407666 A1* | 12/2022 | Lim | H04W 76/15 |
| 2023/0021413 A1* | 1/2023 | Liu | G06Q 20/3223 |
| 2023/0029683 A1* | 2/2023 | Li | H04W 4/40 |
| 2023/0031087 A1* | 2/2023 | Tussy | H04W 12/06 |
| 2023/0032366 A1* | 2/2023 | Lee | H04W 12/50 |
| 2023/0100148 A1* | 3/2023 | Lee | H04L 63/126 |
| | | | 726/26 |
| 2023/0132947 A1* | 5/2023 | Oh | G06F 3/04162 |
| | | | 345/179 |
| 2023/0134002 A1* | 5/2023 | Mehrtash | G06Q 50/265 |
| | | | 726/18 |
| 2023/0147815 A1* | 5/2023 | Cho | H04W 12/069 |
| | | | 713/168 |
| 2023/0259726 A1* | 8/2023 | Singal | G06Q 10/10 |
| | | | 382/187 |
| 2023/0267564 A1* | 8/2023 | Giraud | H04L 63/0861 |
| | | | 705/325 |
| 2023/0308851 A1* | 9/2023 | Mars | H04L 63/123 |
| 2023/0351377 A1* | 11/2023 | Sibert | H04L 9/3231 |

FOREIGN PATENT DOCUMENTS

| | | |
|---|---|---|
| KR | 10-2016-0036414 A | 4/2016 |
| KR | 10-2017-0142983 A | 12/2017 |
| KR | 10-2018-0067183 A | 6/2018 |
| KR | 10-2020-0028827 A | 3/2020 |
| KR | 10-2020-0104043 A | 9/2020 |
| WO | 2020/113223 A1 | 6/2020 |

OTHER PUBLICATIONS

Written Opinion dated Apr. 4, 2022.
Shipeng Gao et al., 'A lightweight Fingerprint-based Device Authentication Architecture for Wireless Industrial Automation Networks', 2019 1st International Conference on Industrial Artificial Intelligence (IAI), Sep. 30, 2019.

* cited by examiner

ELECTRONIC DEVICE FOR PROVIDING DIGITAL ID INFORMATION AND METHOD THEREOF

CROSS-REFERENCE TO RELATED APPLICATION(S)

This application is a continuation of International Application No. PCT/KR2021/019639, filed on Dec. 22, 2021, which claims priority to Korean Patent Application No. 10-2020-0180496, filed on Dec. 22, 2020 in the Korean Intellectual Property Office, the disclosures of which are herein incorporated by reference.

TECHNICAL FIELD

Certain embodiments disclosed in this document relate to an electronic device for providing digital ID information and a method therefor and relate to, for example, to an electronic device capable of providing information included in a digital ID to external devices and a method therefor.

BACKGROUND ART

With the development of digital technology, there has been proliferation in the variations and types of electronic devices, such as mobile communication terminals, personal digital assistants (PDAs), electronic notebooks, smartphones, tablet personal computers (PCs), or wearable devices, which have becoming increasingly and widely used. Further, the underlying hardware and/or software of the electronic device is constantly undergoing upgrade and improvement to support and enable an ever-growing diversity of functions executable by these devices.

Recently, various services have been developed in which electronic devices execute communication using a short-range wireless communication methods, such as ultra-wide band (UWB) communication. Various services are provided based on the same, by interworking with external electronic devices.

Identification cards are often issued by various agencies and institutions to prove a user's identity. One disadvantage of these cards is that the user's identity information is typically printed on a face of the identification card, which exposes it to possible information theft. Furthermore, users suffer the inconvenience of the requisite possession and carrying of the identification card. There is also high risk of losing or otherwise misplacing the identification card, which may result in malicious use of a stolen or misplaced card, and the further inconvenience for users to have cards canceled and/or reissued.

The technical problems to be solved in the disclosure are not limited to the technical problems mentioned above, and other technical problems that are not mentioned above will be clearly understood by those of ordinary skill in the art to which the disclosure pertains from the description below.

SUMMARY

Certain embodiments of the disclosure are intended to provide an electronic device capable of receiving and storing an issued digital identification (ID), and provide information identity information included in the digital ID to an external electronic device, via a short-range wireless communication method, such as UWB (ultra-wide band) communication.

An electronic device according to certain embodiments disclosed in this document may include a secure element, a sensor module, a wireless communication module, at least one processor operably connected to the secure element, the sensor module, and the wireless communication module, and a memory operably connected to the at least one processor. According to various embodiments, the memory may be configured to store instructions executable by the processor to cause the device to: receive a signal from an external electronic device via the wireless communication module, determine identity information utilized for a service provided by an external electronic device, based on the received signal, authenticate a user using user authentication information received via the sensor module, based on successful authentication of the user, retrieve the identity information from a digital identification (ID) stored in the secure element, and transmit the retrieved identify information to an authentication server, receive an authentication confirmation for the identity information from the authentication server, and transmit the authentication information to the external electronic device.

A method of an electronic device according to certain embodiments disclosed in this document may include receiving, via a wireless communication circuit, a signal from an external electronic device, determining, via at least one processor, identity information utilized for a service provided by an external electronic device, based on the received signal, authenticating a user using user authentication information received via a sensor module of the electronic device, based on successful authentication of the user, retrieving the identity information from a digital identification (ID) stored in a secure element of the electronic device, and transmitting the retrieved identify information to an authentication server, receiving an authentication confirmation for the identity information from the authentication server, and transmitting the authentication information to the external electronic device.

According to certain embodiments, it is possible to receive and store an issued digital ID for a user through a network, and confirm the user's digital ID information via interworking with an external electronic device (e.g., a point-of-service or "POS" terminal, an authentication server, or a UWB server), thereby preventing unnecessary exposure of the user's personal identity information.

According to certain embodiments, it is possible to confirm a user's identify information, without exposing the actual personal identity information to possible leakage, by providing the requested information from the digital ID through an authentication server.

According to certain embodiments, it is possible to reduce user inconvenience involved with possessing, carrying and utilizing physical identification cards. Further, identity information can be selectively provided, rather than being completely exposed, as with a physical identity card, thereby preventing unnecessary exposure of personal identity information to potential leakage.

According to certain embodiments, by enabling confirmation of the personal identity information through an authentication server, the user's personal information is not exposed at all within a local environment, as with a traditional physical identity card.

In addition, various effects directly or indirectly recognized may be provided through this document.

BRIEF DESCRIPTION OF DRAWINGS

In connection with the description of the drawings, the same or similar reference numerals may indicate the same or similar elements.

DETAILED DESCRIPTION

Figure 1:
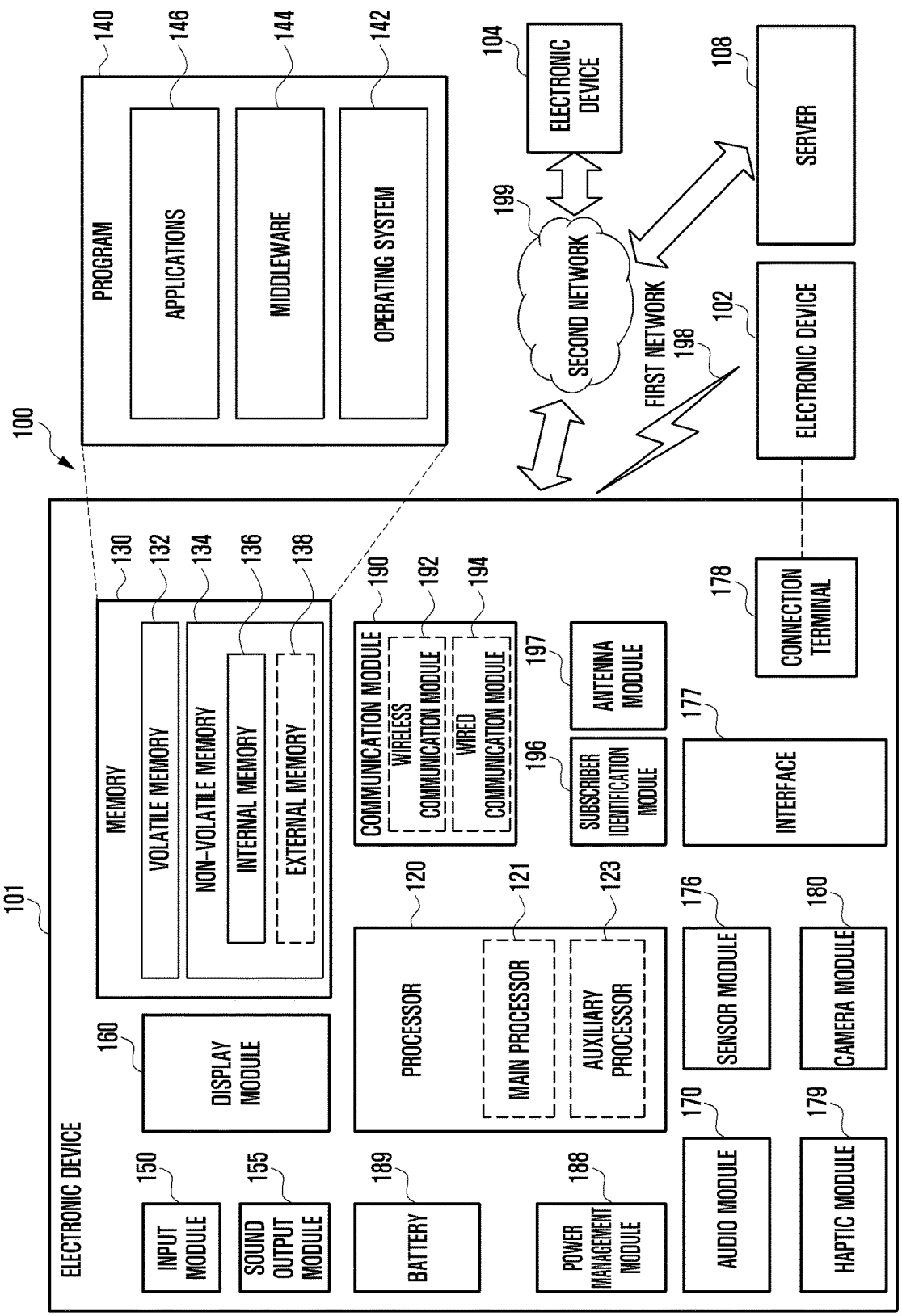
FIG. 1 is a block diagram of an electronic device in a network environment, according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
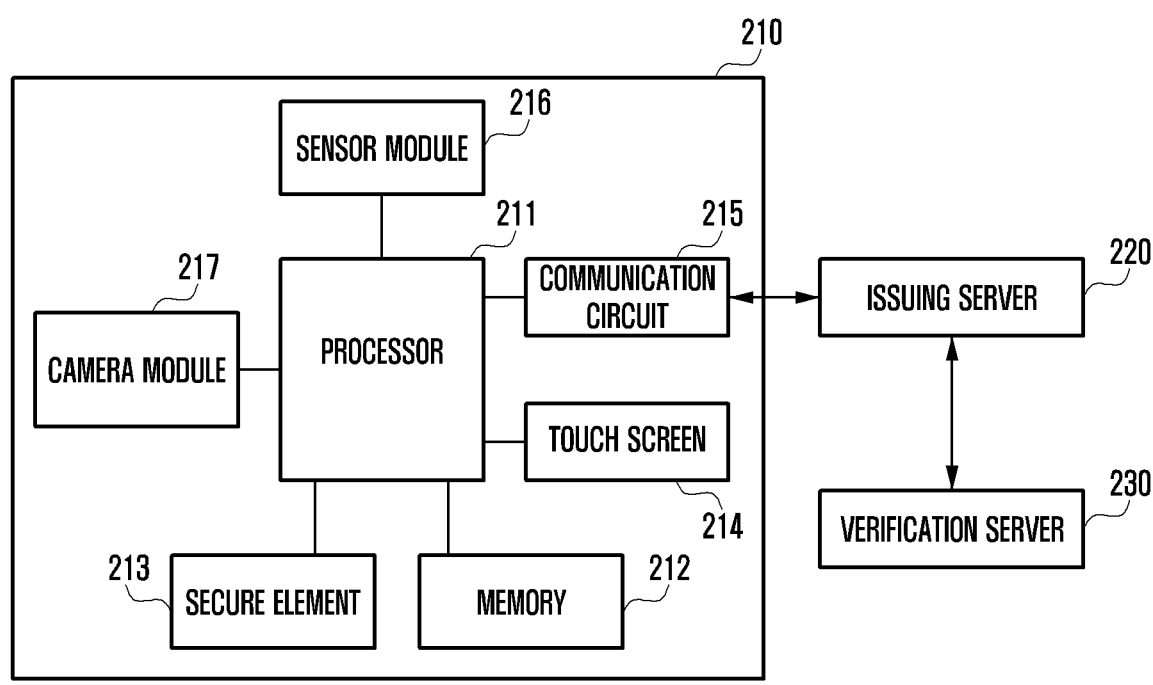
FIG. 2 is a block diagram of an electronic device for receiving and storing an issued digital ID in a network environment, according to certain embodiments.

FIG. 2 is a block diagram of an electronic device for receiving and storing an issued digital ID in a network environment, according to certain embodiments.

Referring to FIG. 2, in order to issue a digital ID to the user, an electronic device 210 (e.g., the electronic device 101 in FIG. 1) may request issuance of a digital ID corresponding to identity information of the user by communicating with a server (hereinafter, referred to as an issuing server) 220 operated by, for example, a digital ID issuing organization.

According to certain embodiments, the electronic device 210 and the issuing server 220 may transmit and receive data encrypted based on a specified secure channel protocol (e.g., SCP11a) and decrypt the received data.

According to certain embodiments, the issuing server 220 may store and manage information about various certificates (e.g., real-name verification certificates) capable of authenticating or verifying a user's identity, such as various identification cards, for example, an identification card, a driver's license, and/or a passport, which are issued by the user from an issuing authority (IA) (e.g., Korea Information Certificate Authority), such as national authorities. For example, when the user passes a driving test and a driver's license is issued to the user, the issuing server 220 may store and manage the user's identification information and personal information included in the issued driver's license.

According to certain embodiments, in response to a request for issuing a digital ID for the user of the electronic device 210, the issuing server 220 may perform identity verification for the user of the electronic device 210 by interworking with a verification server 230 of a verification agency that verifies the validity of identity card information, and may produce a digital ID for the verified user and transmit the same to the electronic device 210. For example, the verification server 230 may identify or authenticate the electronic device 210 through a communication network such as a first network (e.g., the first network 198 in FIG. 1) or a second network (e.g., the second network 199 in FIG. 1) using, for example, subscriber information for the owner of the electronic device 210 (e.g., subscriber information (e.g., the international mobile subscriber identifier (IMSI)) stored in the subscriber identification module 196 in FIG. 1), thereby verifying the validity of at least some user identity information received from the electronic device 210. As the user identity information is verified by the verification server 230, the electronic device 210 may receive, from the verification server 230, an Internet address (URL (uniform resource locator)) for accessing the verification server 230 and a one-time token for accessing data corresponding to the identity verification result. The Internet address of the verification server 230 may be configured to include, for example, communication protocol (e.g., https), a domain name of the verification server 230, and a token. Here, although the issuing server 220 and the verification server 230 have been described as separate servers, the issuing server 220 and the verification server 230 may be an integrated server.

According to certain embodiments, the verification server 230 may include substantially the same element as at least one of the elements of the electronic device 210. For example, the verification server 230 may include a communication module, a memory, and a processor. The elements of the verification server 230 may be operably or electrically connected to each other. The communication module of the verification server 230 may support data communication through a network between the verification server 230 and an external electronic device (e.g., the electronic device 210 or the issuing server 220). The memory of the verification server 230 may store instructions that cause, when executed, the processor to perform an operation of verifying identity information of the user by performing data communication (e.g., end-to-end encrypted communication) with the electronic device 210 through a network, an operation of transmitting a URL including a token for accessing an identity information verification result to the electronic device 210 through the network, and an operation of providing an identity verification result to a service server (e.g., the service server 440 in FIG. 4) accessed using the token.

According to certain embodiments, the electronic device 210 may include a processor 211 (e.g., the processor 120 in FIG. 1), a memory 212 (e.g., the memory 130 in FIG. 1), a secure element 213 (a secure element or trust zone), a touch screen 214 (e.g., the display module 160 in FIG. 1), a communication circuit 215 (e.g., the communication module 190 in FIG. 1), a sensor module 216 (e.g., the sensor module 176 in FIG. 1), or a camera module 217 (e.g., the camera module 180 in FIG. 1). In some embodiments, the electronic device 210 may exclude at least one of the elements or further include some elements (e.g., the antenna module 197 in FIG. 1), or some (e.g., the sensor module 216 or the camera module 217) may be integrated into one element (e.g., the touch screen 214). Hereinafter, for convenience of description, the descriptions that have been made with reference to the elements of the electronic device 101 in FIG. 1 may be omitted.

According to certain embodiments, the processor 211 of the electronic device 210 may guide photographing of a user's identification card (e.g., a residential registration card, a driver's license, or a passport) through the touch screen 214 according to execution of, for example, a digital ID issuance application to issue a digital ID and enable scanning of an identification card image through the camera module 217.

According to certain embodiments, the processor 211 may extract and obtain identity information including image information and text information from the identity card image scanned through the camera module 217 using OCR (optical character recognition) technology, encrypt at least some identity information, and transmit the same to the issuing server 220 through the communication circuit 215 in order to issue a digital ID. According to an embodiment, the processor 211 may obtain the user's identity information by a method of tagging an electronic identification card to the electronic device 210 using NFC (near field communication) technology or a method in which a user directly inputs the information recorded on the identification card into the electronic device 210, in addition to the scanning method through the camera module 217 described above. As described above, by interworking with the verification server 230, the issuing server 220 may verify whether or not the received identity information is valid, and may produce a digital ID based on the validated identity information and transmit the same to the electronic device 210.

According to certain embodiments, the processor 211 may bind (e.g., associate) the received digital ID to, for example, at least one piece of the user's biometric information input through the sensor module 216 or other secure information (e.g., a user password or a secure pattern), and store the same in the secure element 213. For example, the secure element 213 may provide security in storage to the electronic device 210. For example, the secure element 213 may be isolated from the operating system of the electronic device 210. For example, the secure element 213 may be accessed by an approved program (e.g., an application and/or an applet) and inaccessible to unapproved programs. For example, the secure element 213 may store security-sensitive information according to execution of a specified security application (e.g., a payment application or an authentication application). For example, the secure element 213 may be a space (or area) included in a partial region of the memory 212, or may be implemented as a chip physically separated from the processor 211 (or the memory 212). For example, the secure element 213 may be a secure element (eSE) embedded in the electronic device 210.

According to certain embodiments, the memory 212 may store a basic program for the operation of the electronic device 210, application programs, and a variety of data such as setting information. The memory 212 may be configured as a volatile memory, a non-volatile memory, or a combination of the volatile memory and the non-volatile memory. The memory 212 may provide stored data according to a request of the processor 211.

According to certain embodiments, the touch screen 214 (e.g., the display module 160 in FIG. 1) may visually provide information (e.g., the user's identity information) to the outside (e.g., the user) of the electronic device 210. According to an embodiment, the touch screen 214 may include a touch detection circuit (or a touch sensor) (not shown), a pressure sensor capable of measuring the intensity of a touch, and/or a touch panel (e.g., a digitizer) capable of detecting a magnetic stylus pen. According to an embodiment, the touch screen 214 may be configured as a liquid crystal display (LCD), an OLED (organic light-emitted diode), an AMOLED (active matrix organic light emitted diode), a flexible display, or expandable display.

Figure 4:
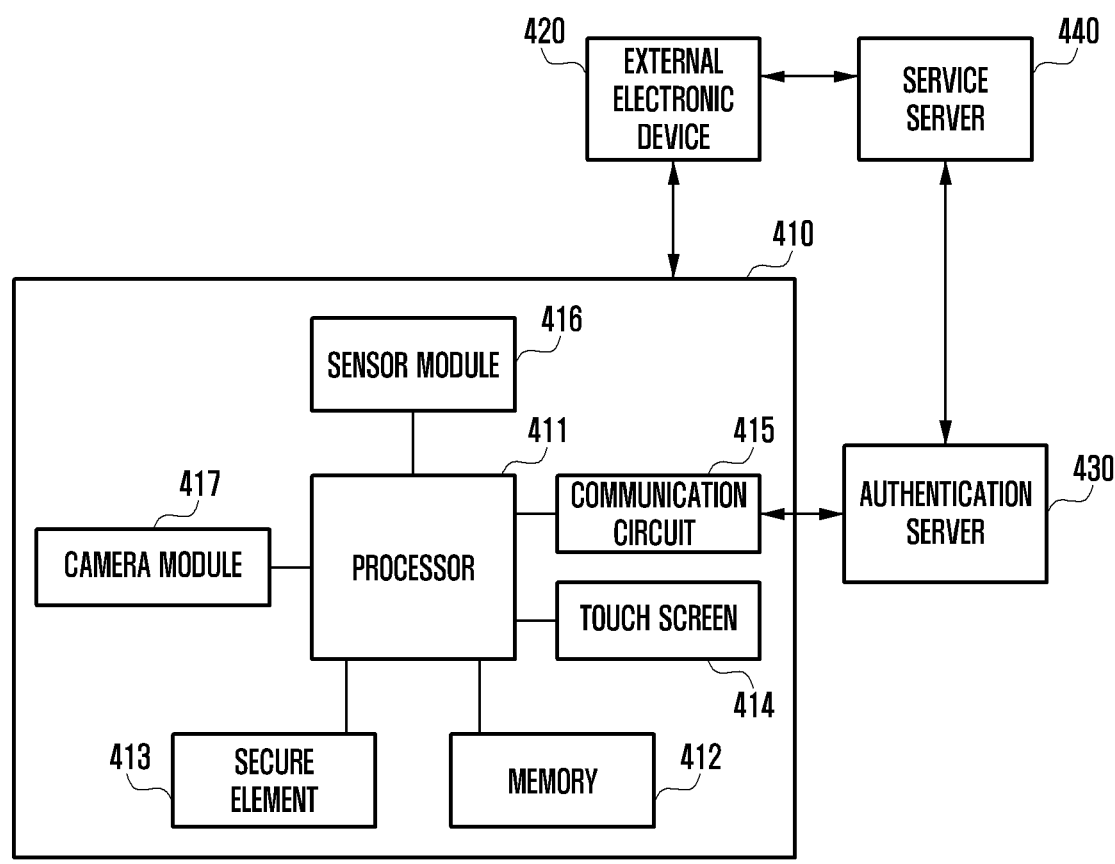
FIG. 4 is a block diagram of an electronic device for confirming digital ID information in a network environment, according to certain embodiments.

According to certain embodiments, the communication circuit 215 may support data communication between the electronic device 210 and an external electronic device (e.g., the issuing server 220, the verification server 230, or the authentication server 430 in FIG. 4) through a network. According to an embodiment, the communication circuit 215 may include a first communication module configured to support wireless communication of the electronic device 210 through a second network (e.g., a cellular network) (e.g., the second network 199 in FIG. 1) and a second communication module configured to support wireless communication of the electronic device 210, based on OOB (out of band) (e.g., NFC, BLE, UWB, Zigbee, and/or Wi-Fi (wireless fidelity) 2.4 GHz). For example, the second communication module may include a UWB communication module capable of transmitting and receiving UWB signals to and from an external electronic device using a plurality of antennas for UWB communication. According to an embodiment, the electronic device 210 may communicate with an external server (e.g., 220 and/or 230) using the first communication module. According to an embodiment, the electronic device 210 may communicate with an external electronic device (e.g., the external electronic device 420 in FIG. 4) through a first network (e.g., a short-range communication network such as Bluetooth, NFC, Wi-Fi direct, or IrDA (infrared data association)) (e.g., the first network 198 in FIG. 1), which is different from the second network, using the second communication module.

According to certain embodiments, the sensor module 216 may include a biometric sensor for producing data used to recognize the user's biometric information. For example, the biometric sensor may include a fingerprint sensor that detects a user's fingerprint and/or an image sensor (e.g., an infrared sensor) that detects feature points of the user's iris or face.

FIGS. 3A to 3G are diagrams illustrating the operation of an electronic device (e.g., the electronic device 210 in FIG. 2) for receiving and storing an issued digital ID, according to certain embodiments.

Figure 3A:
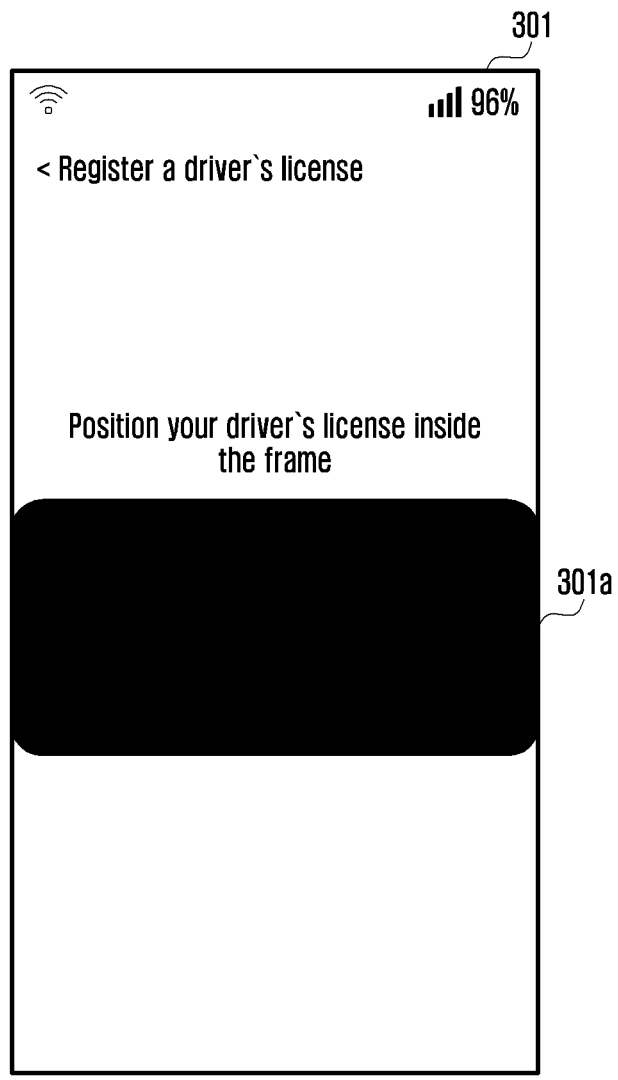
FIGS. 3A to 3G are diagrams illustrating the operation of an electronic device for receiving and storing an issued digital ID, according to certain embodiments.

According to certain embodiments, if a user executes a digital ID application in order to issue a digital ID, the application may display a guide screen 301 on a touch screen (e.g., the touch screen 214 in FIG. 2), as shown in FIG. 3A, which includes a photographing area 301a for capturing an image of a physical identification card of the user.

Figure 3B:
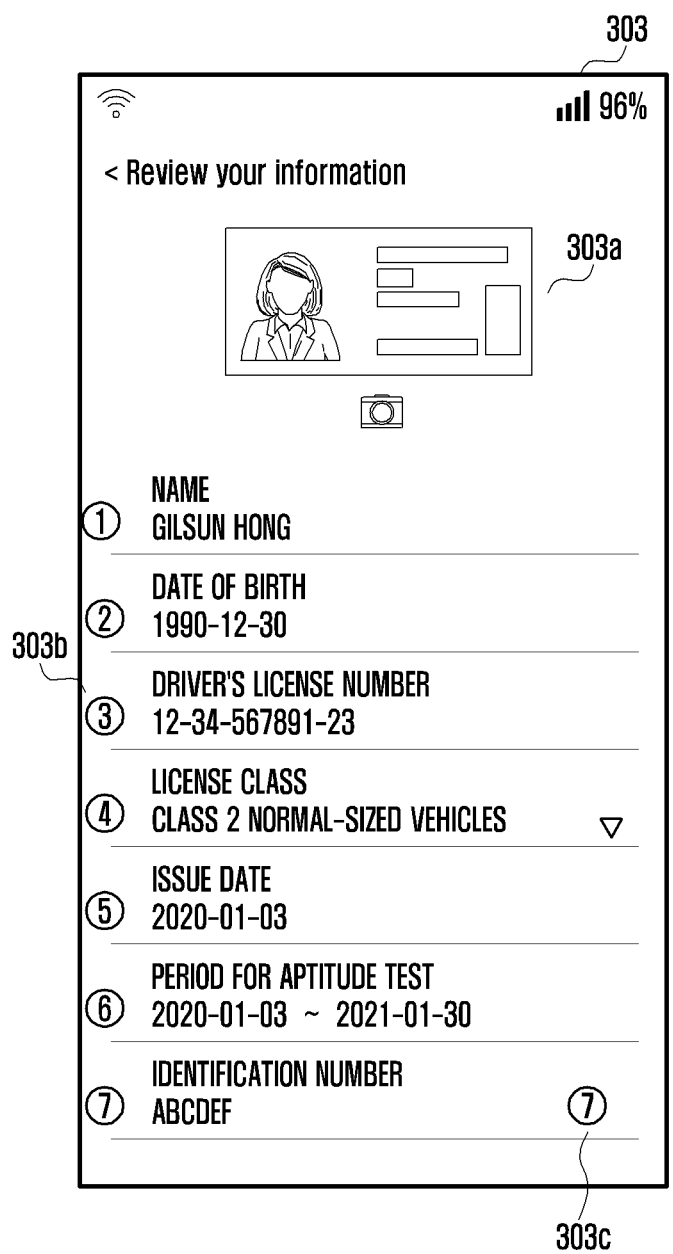

According to certain embodiments, when the user places the physical identification card in the photographing area 301a of the guide screen 301, the application may display an image 303a of the physical identification card through the ID information screen 303 as shown in FIG. 3B, and, in addition thereto, may scan text information from the physical identification card using, for example, an OCR (optical character reader) program stored in a memory (e.g., the memory 212 in FIG. 2), and display the scanned text in a text information area 303b.

Figure 3C:
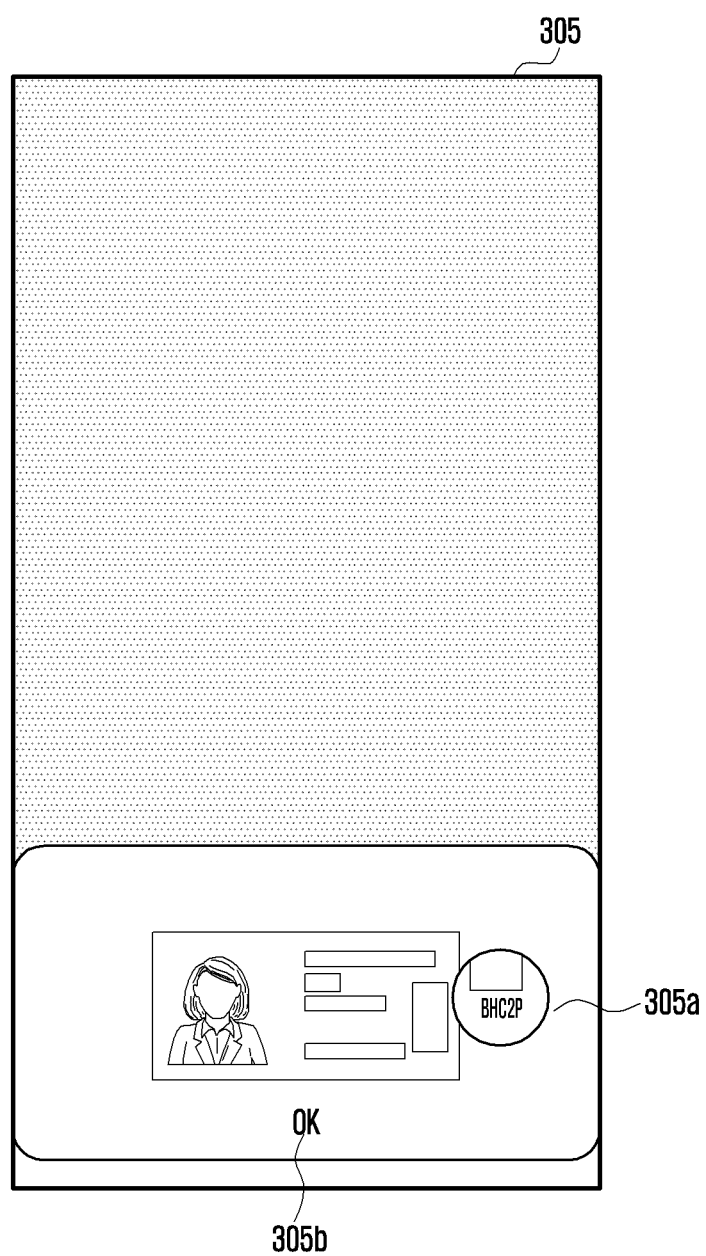

According to certain embodiments, the user may identify the text information displayed in the text information area 303b in FIG. 3B, and select a button 303c which may indicate pieces of identification information that should be hidden from displayed, or actively displayed, as seen in, for example, the detailed information screen 305 shown in FIG. 3C. Thus, the detailed information 305a for display may be selected and confirming through a confirmation button 305b.

Figure 3D:
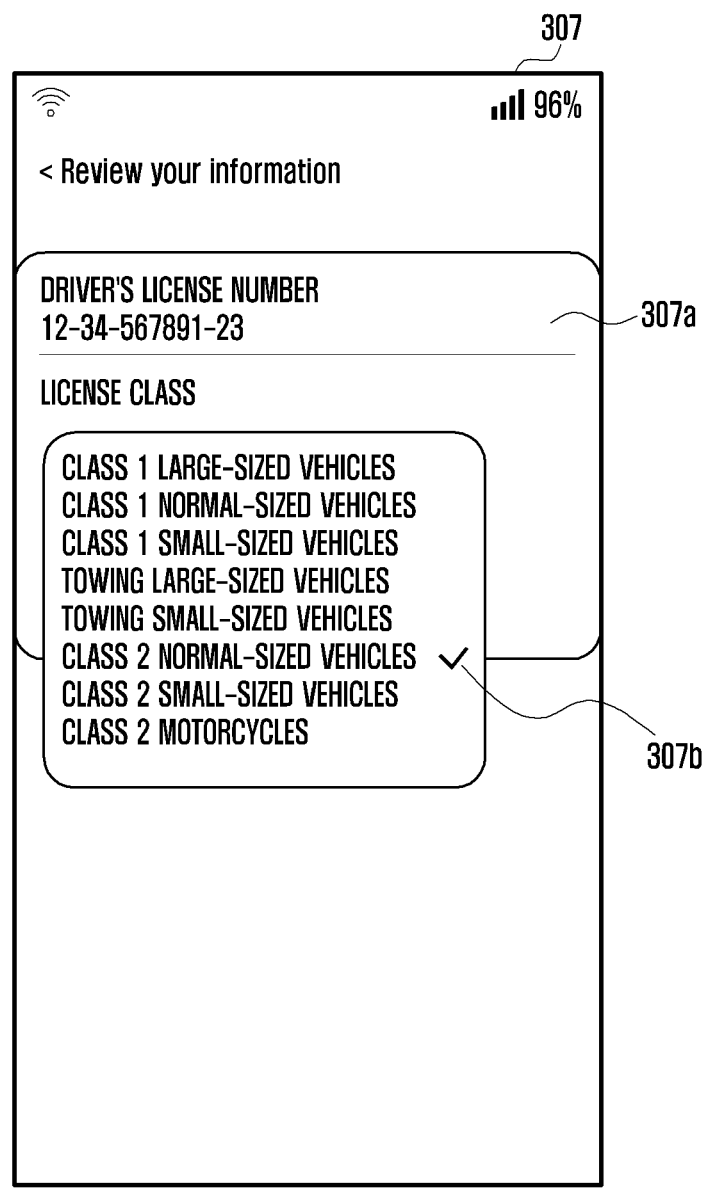

According to certain embodiments, it is possible to identify the text information displayed in the text information area 303b in FIG. 3B and to further display, for example, a detailed information screen 307 for unidentified information shown in FIG. 3D, thereby performing direct input through a detailed-information input area 307a or selecting corresponding information through a detailed-information selection area 307b.

Figure 3E:
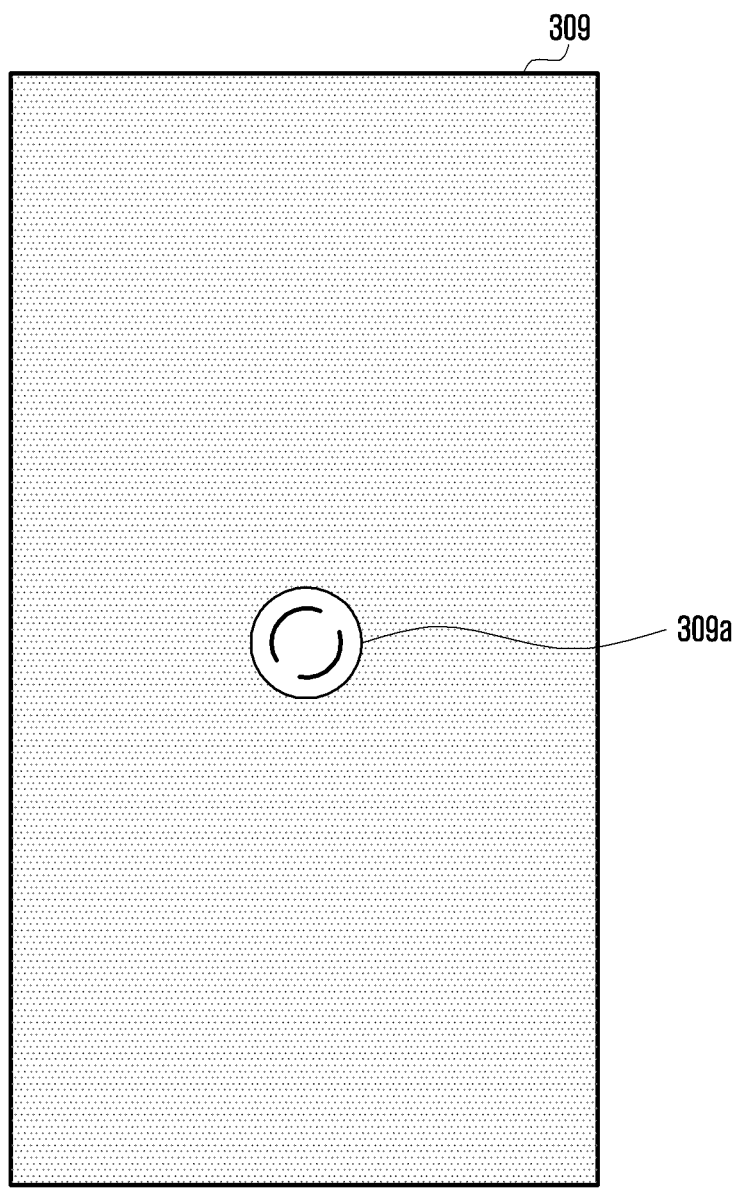

According to certain embodiments, the application may request an issuing server (e.g., the issuing server 220 in FIG. 2) to issue a digital ID for the input physical-identification card information, and indicate that an issuing procedure thereof is in progress through an icon 309a of a screen 309 shown in FIG. 3E.

Figure 3F:
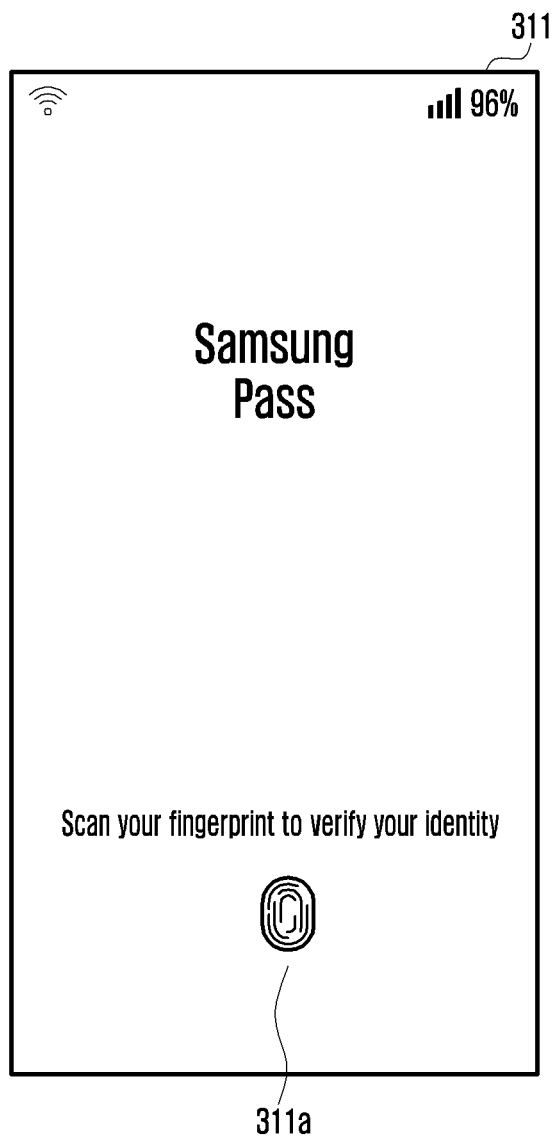

According to certain embodiments, when the digital ID is issued according to the issuance request, the application may display, for example, a fingerprint information input guide 311a through a screen 311 shown in FIG. 3F to guide the user to input biometric information of the user thereto.

Figure 3G:
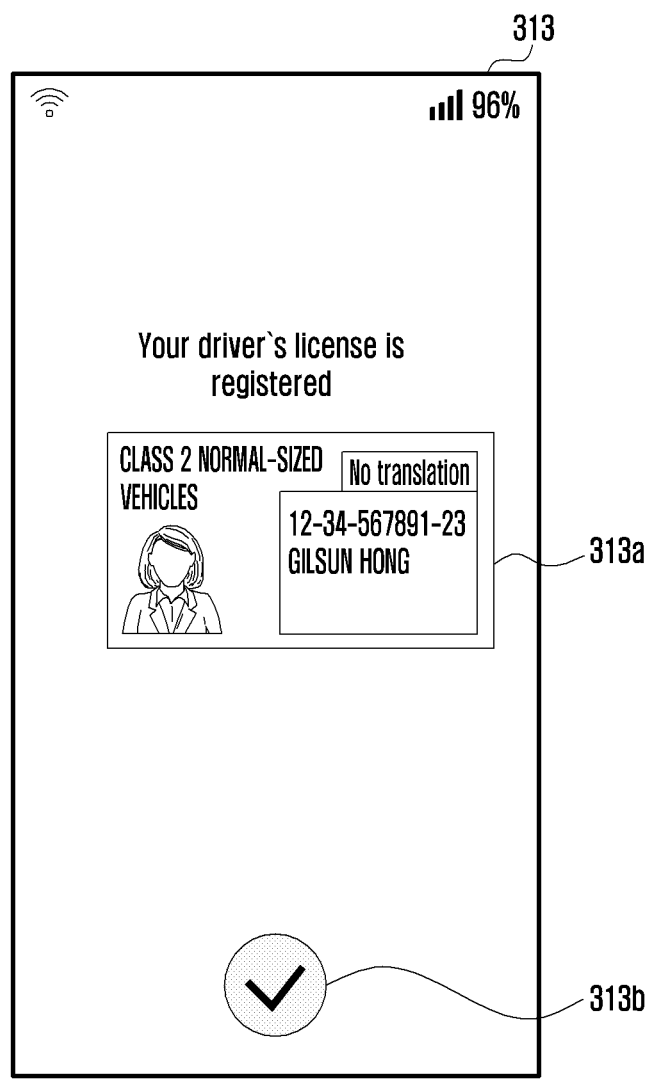

According to certain embodiments, the application may bind the digital ID to the input biometric information, store the same in a secure element (e.g., the secure element 213 in FIG. 2), indicate that the digital ID has been issued and stored by displaying a digital ID image 313a through a screen 313 in FIG. 3G, and display a confirmation button 313b in order for the user to end the process.

FIG. 4 is a block diagram of an electronic device for providing requested digital ID information in a network environment, according to certain embodiments.

Referring to FIG. 4, an electronic device 410 (e.g., the electronic device 101 in FIG. 1 or the electronic device 210 in FIG. 2) may receive a request for confirmation of at least some specified identity information among the user identity information of the digital ID through communication with an external electronic device (e.g., a UWB (ultra-wide band) device) 420. According to certain embodiments, the electronic device 410 may encrypt at least some identity information among the user identity information of the digital ID and transmit the same to an authentication server 430, and may receive an address (uniform resource locator, URL) for accessing at least some identity information and a one-time token for accessing at least some specified identity information and transmit the same to the external electronic device 420. In some embodiments, the authentication server 430 may be implemented as one with the verification server 230 described with reference to FIG. 2. For example, the authentication server 430 and the verification server 230 may be one integrated server. In some embodiments, the verification server 230 may be implemented as a server that issues a digital ID, and the authentication server 430 may be implemented as a server that authenticates at least some of the user identity information of the issued digital ID. For example, the authentication server 430 and the verification server 230 may be separate servers.

According to certain embodiments, the external electronic device 420 may transmit the received address and token to the service server 440, and the service server 440 may communicate with the authentication server 430, based on the address and token, to authenticate at least some specified identity information and inform the external electronic device 420 of an authentication result thereof. For example, the authentication result may include information indicating whether or not at least some specified identity information of the user has been authenticated (e.g., that the user has a driver's license, that the user's name and ID match the name and ID of a presented list, or that the user is an adult).

According to certain embodiments, the electronic device 410 may include a processor 411 (e.g., the processor 120 or 211 in FIG. 1 or FIG. 2), a memory 412 (e.g., the memory 130 or 212 in FIG. 1 or FIG. 2), a secure element (or trust zone) 413 (e.g., the secure element 413 in FIG. 2), a touch screen 414 (e.g., the display module 160 in FIG. 1 or the touch screen 214 in FIG. 2), a communication circuit 415 (e.g., the communication module 190 in FIG. 1 or the communication circuit 215 in FIG. 2), a sensor module 416 (e.g., the sensor module 176 in FIG. 1 or the sensor module 416 in FIG. 2), or a camera module 417 (e.g., the camera module 180 or 217 in FIG. 1 or FIG. 2). In some embodiments, the electronic device 410 may exclude at least one of the elements or further include some elements (e.g., the antenna module 197 in FIG. 1), or some (e.g., the sensor module 416 or the camera module 417) may be integrated into one element (e.g., the touch screen 414). Hereinafter, for convenience of description, the descriptions that have been made with reference to the elements of the electronic device 101 in FIG. 1 and the electronic device 210 in FIG. 2 may be omitted.

According to certain embodiments, the processor 411 may control the communication circuit 415 to communicate with the external electronic device 420 through, for example, a first network (e.g., a short-range communication network such as UWB (ultra-wide band), Bluetooth, WiFi (wireless fidelity) direct, or IrDA (infrared data association)) as the electronic device 410 and the external electronic device 420 approach each other. For example, the external electronic device 420 may include a POS (point of sale) terminal provided in a store, a passenger access control terminal installed at the boarding gate for an airplane or ship, or a door lock device or access control device installed in a vehicle or building.

According to certain embodiments, the external electronic device 420 may include, for example, a reader for reading codes (e.g., barcodes or QR (quick response) codes) and a communication module for communicating with the electronic device 410 and/or the service server 440 through a first network and/or a second network (e.g., a long-range communication network such as a legacy cellular network, a 5G network, a next-generation communication network, the Internet, or a computer network (e.g., LAN or WAN)).

According to certain embodiments, the processor 411 may receive an authentication request for at least one piece of utilized identity information from the external electronic device 420. For example, the specified identity information may include information indicating that the user has a driver's license, information indicating that the user's name and ID match the name and ID of a presented list, or information indicating that the user is an adult. For example, when the electronic device 410 approaches the external electronic device 420 within a specified distance, the processor 411 may identify at least one piece of identity information utilized to receive a specified service from the external electronic device 420 without an authentication request for at least one piece of identity information from the external electronic device 420.

According to certain embodiments, the processor 411 may identify at least one or more pieces of utilized identity information, based on a service to be provided through the external electronic device 420. For example, the processor 411 may identify a service provided by the external electronic device, based on a signal received from the external electronic device 420, and identify utilized information.

According to certain embodiments, at least one or more pieces of utilized identity information may be identified through an authentication information request signal received from the external electronic device 420. For example, if the external electronic device 420 is a POS payment terminal located at a convenience store, the processor 411 may identify that utilized identity information is information on the date of birth, based on an adult authentication request received from the POS payment terminal. For example, the authentication information request signal received from the external electronic device 420 may include a request for confirmation about whether the user has a driver's license, whether the user's name and ID match the name and ID of a presented list or reservation, or whether the user is an adult.

According to certain embodiments, if an authentication request for at least one piece of utilized identity information is received from the external electronic device 420 or if a service is desired to be provided by approaching the external electronic device 420 within a specified distance, the processor 411 may provide a user notification (e.g., a push notification) thereof through, for example, the touch screen 414 display of the electronic device 410.

According to certain embodiments, if the electronic device 410 approaches the external electronic device 420 within a specified distance, based on positioning through ranging using, for example, a UWB signal, the processor 411 may activate a specified application to receive a service provided by the external electronic device 420 based on a signal received from the external electronic device 420.

According to certain embodiments, the processor 411 may determine distance information of the external electronic device 420 using a ranging response signal (UWB signal) received from the external electronic device 420 through the communication circuit 415 (e.g., a UWB communication module). According to an embodiment, the processor 411 may control the communication circuit 415 to calculate the time for which UWB signals (e.g., a ranging request message and a ranging response message) are transmitted and received between the electronic device 410 and a nearby external electronic device 420, thereby determining information on distance between the electronic device 410 and the external electronic device 420. For example, the processor 411 may receive a ranging response signal from the external electronic device 420 by controlling a plurality of antennas (e.g., UWB antennas) included in the communication circuit 415, and determine distance information, which is ranging information of the external electronic device 420, and/or the location of the electronic device 210 using a first reception time of a ranging response signal received through a first antenna among the plurality of antennas, a second reception time of a ranging response signal received through a second antenna among the plurality of antennas, and a phase difference therebetween.

According to certain embodiments, if the distance information, which is ranging information of the external electronic device 420, is equal to or less than a specified distance, based on positioning through ranging using UWB signals between the electronic device 410 and the external electronic device 420, the processor 411 may activate a specified application to receive a service provided by the external electronic device 420, based on a signal received from the external electronic device 420.

For example, if it is identified that the external electronic device 420 is a POS device for receiving a payment service, the processor 411 may activate an application to use the payment service. For example, the processor 411 may, for example, provide through the touch screen 414 display of the electronic device 410, a user notification to confirm whether or not to receive a corresponding service through the activated application and/or whether or not to provide at least one piece of identity information for receiving the corresponding service.

According to certain embodiments, the processor 411 may start user authentication to obtain, from the secure element 413, identity information for receiving a service through the external electronic device 420. For example, if the user approves the provision of identity information, based on the user notification for receiving a service from the external electronic device 420, the processor 411 may start user authentication to obtain identity information to be transmitted.

According to certain embodiments, the processor 411 may perform user authentication and access the secure element 413 that stores a digital ID bound to biometric information. For example, the processor 411 may authenticate the user by receiving user authentication information (e.g., a variety of biometric information including fingerprint information, iris information, and/or face information, passwords, or password patterns) through the sensor module 416, the camera module 417, and/or the touch screen 414, thereby obtaining at least some specified identity information from the digital ID stored in the secure element 413.

According to certain embodiments, the processor 411 may transmit the specified identity information obtained from the secure element 413 to the authentication server 430 through, for example, a second network (e.g., a long-range communication network such as a legacy cellular network, a 5G network, a next-generation communication network, the Internet, or a computer network (e.g., LAN or WAN)) by controlling the communication circuit 415 to request authentication. For example, the electronic device 410 and the authentication server 430 may transmit/receive data to/from each other as encrypted data based on a specified secure channel protocol (e.g., SCP11a).

According to certain embodiments, when the authentication for the specified identity information is completed by the authentication server 430, the processor 411 may access the authentication server 430 and transmit information (e.g., address information such as a URL and/or a one-time token) utilized to obtain an authentication result for the specified identity information to the electronic device 410.

According to certain embodiments, the processor 411 may produce encrypted data (e.g., barcodes or QR codes), based on the information received from the authentication server 430, and transmit the same to the external electronic device 420. For example, the processor 411 may display the barcode or QR code on the touch screen 414 of the electronic device 410 and cause the external electronic device 420 to obtain a URL and a token from the barcode or QR code. As another example, the electronic device 410 may identify a domain name from the URL and recognize that the identified domain name matches a known domain name (e.g., kica.co.kr). As described above, if the domain name of the authentication server 430 is fixed, the electronic device 410 may include the one-time token in the code and display the same on the touch screen 414 so that the external electronic device 420 may obtain the token from the barcode or QR code.

According to certain embodiments, the external electronic device 420 may transmit the obtained URL and token to the service server 440 to request authentication of the specified identity information for the user. For example, the external electronic device 420 may encrypt the obtained URL and token, based on a specified secure channel protocol (e.g., SCP11a), and transmit the encrypted data to the service server 440.

According to certain embodiments, the service server 440 may be an online server of a 3rd party that provides services to the user. The service server 440 may perform data communication with the authentication server 430 through an authentication protocol (e.g., OAuth (open authentication) 2.0). In the case where the user's identity authentication or adult authentication is utilized to precede provision of services to the user, the service server 440 may request user information from the authentication server 430 and receive an authentication result from the authentication server 430. For example, the service server 440 may access the authentication server 430 acting as an identity authentication agent using the URL and token received from the external electronic device 420 to confirm the authentication result of the specified identity information for the user. If the token is received from the external electronic device 420, the service server 440 may configure a URL using the already known domain name of the authentication server 430 and the received token. The service server 440 may access the authentication server 430 with the configured URL to confirm the user's identity authentication result. For example, the authentication server 430 may perform authentication of the specified identity information for the user of the electronic device 410 and provide the service server 440 with an authentication result indicating whether or not at least some specified identity information of the user has been authenticated (e.g., the user has a driver's license, the user's name and ID match the name and ID of a presented list, or the user is an adult).

According to certain embodiments, the service server 440 may notify the external electronic device 420 of the authentication result according to the user identity information authentication performed by the authentication server 430. Accordingly, the user may authenticate his/her identity (or that he/she is an adult) using his/her electronic device 410 without a plastic-type identification card, thereby receiving services to be provided (e.g., purchasing adult items, passing through a gate, or entering a vehicle or building). In some embodiments, the service server 440 may perform authentication for the issued identity information. For example, the service server 440 may be an integrated server with the authentication server 430.

According to certain embodiments, an electronic device (e.g., the electronic devices 101, 210, and/or 410 in FIG. 1, FIG. 2, or FIG. 3) may include: a secure element (e.g., the secure element 213 or 413 in FIG. 2 or FIG. 4); a sensor module (e.g., the sensor module 176, 216, or 416 in FIG. 1, FIG. 2, or FIG. 4); a wireless communication module (e.g., the wireless communication module 192 in FIG. 1 or the communication circuit 215 or 415 in FIG. 2 or FIG. 4); at least one processor (e.g., the processor 120, 211, or 411 in FIG. 1, FIG. 2, or FIG. 4) operably connected to the secure element 213 or 413, the sensor module 176, 216, or 416, and the wireless communication module 192, 215, or 415; and a memory (e.g., the memory 130, 212, or 412 in FIG. 1, FIG. 2, or FIG. 4) operably connected to the at least one processor 120, 211, or 411, in which the memory 130, 212, or 412 may be configured to store instructions that cause, when executed, the processor 120, 211, or 411 to identify at least some identity information utilized for a service provided by an external electronic device (e.g., the electronic device 102 in FIG. 1 or the external electronic device 420 in FIG. 4), based on a signal received from the external electronic device 102 or 420 through the wireless communication module 192, 215, or 415, receive user authentication information through the sensor module 176, 216, or 416 to perform user authentication, if the user authentication is completed, obtain the at least some identity information from information of a digital ID stored in the secure element 213 or 413 and transmit the same to an authentication server (e.g., the authentication server 430 in FIG. 4), receive authentication information for authentication confirmation of the at least some identity information from the authentication server 430, and transmit the authentication information to the external electronic device 102 or 420.

According to certain embodiments, the processor 120, 211, or 411 may be configured to measure at least one of a location of the electronic device 101, 210, or 410 and a distance from the external electronic device, based on a signal received from the external electronic device 102 or 420.

According to certain embodiments, the processor 120, 211, or 411 may be configured to perform the operation of identifying the identity information if it is identified that at least one of a condition in which the location of the electronic device is included in a specified area and a condition in which the distance from the external electronic device is within a specified distance is satisfied.

According to certain embodiments, the processor 120, 211, or 411 may be configured to measure at least one of the location and the distance, based on time information included in the signal received from the external electronic device 420.

According to certain embodiments, the processor 120, 211, or 411 may be configured to receive a UWB (ultra-wide band) signal including time information from the external electronic device 420 and measure at least one of the location and the distance, based on the received UWB signal.

According to certain embodiments, the processor 120, 211, or 411 may be configured to receive a signal requesting the at least one piece of identity information from the external electronic device 420.

According to certain embodiments, the electronic may further include a display (e.g., the display module 160 in FIG. 1 or the touch screen 214 or 414 in FIG. 2 or FIG. 4), and the processor 120, 211, or 411 may be configured to output a screen for guiding the user authentication through the display 160, 214, or 414 according to the signal received from the external electronic device 420.

According to certain embodiments, the guide screen may be configured to display at least one piece of identification information on the external electronic device 420 and the at least some utilized identity information.

According to certain embodiments, the guide screen may be configured to display a guide including at least one of an image and text for inputting the user authentication information through the sensor module 176, 216, or 416 for the user authentication.

According to certain embodiments, the authentication information received from the authentication server may include at least one of address information and a one-time token for authentication confirmation for the at least some identity information.

According to certain embodiments, the processor 120, 211, or 411 may encrypt the authentication information and provide the same to the external electronic device 420.

According to certain embodiments, the processor 120, 211, or 411 may be configured to bind a digital ID issued based on the user's physical identification card information to user's biometric information input through the sensor module 176, 216, or 416 and store the same in the secure element 213 or 413.

Figure 5:
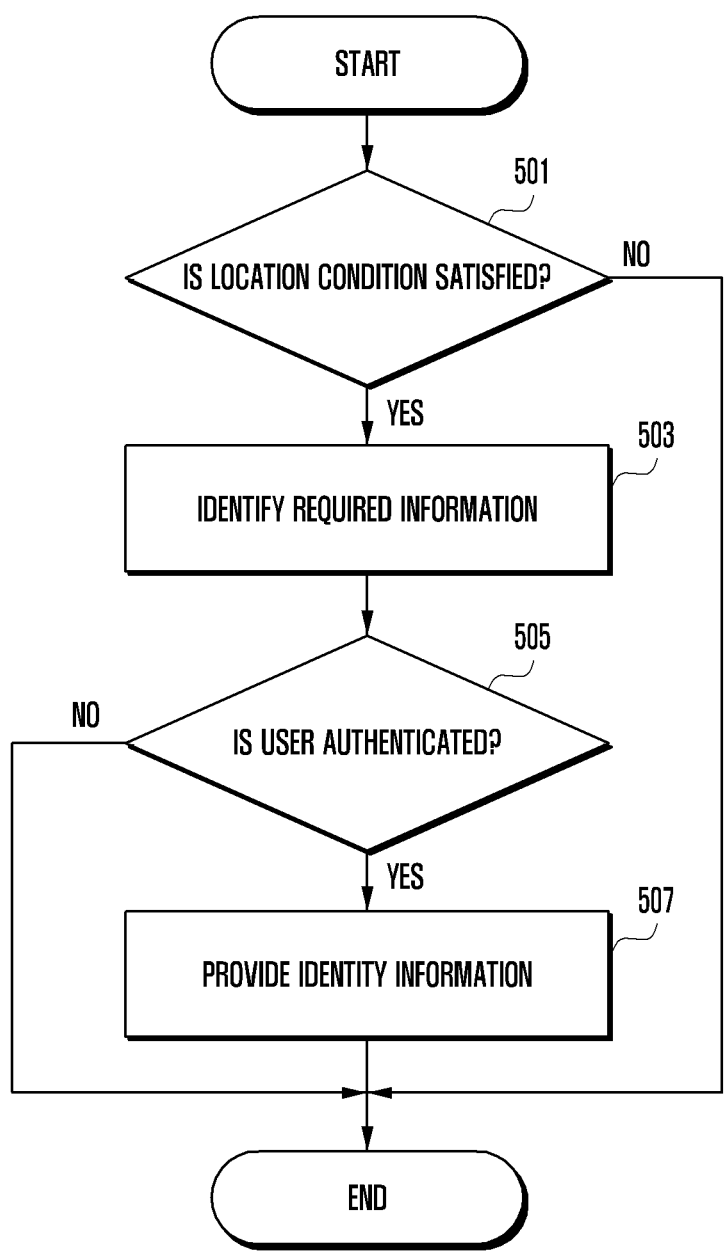
FIG. 5 is a flowchart illustrating a method of confirming digital ID information of an electronic device according to certain embodiments.

FIG. 5 is a flowchart illustrating a method of confirming digital ID information of an electronic device according to certain embodiments.

According to certain embodiments, an electronic device (e.g., the electronic device 101 or 410 in FIG. 1 or FIG. 4) may communicate with an external electronic device (e.g., the external electronic device 420 in FIG. 4) through, for example, a first network (a short-range communication network such as UWB (ultra-wide band), Bluetooth, Wireless Fidelity (WiFi)_direct, or Infrared Data Association (IrDA), so that a processor (e.g., the processor 120 or 411 in FIG. 1 or FIG. 4) of the electronic device may identify whether or not a specified location condition is satisfied in operation 501. For example, he electronic device may detect whether it is moved into a prespecified area (e.g., a store or a parking lot), such as location where the external electronic device is disposed, by detecting the location of the electronic device. For example, the specified location condition may be determined to be satisfied when the relative distance between the electronic device and the external electronic device is less than or equal to a prespecified distance (e.g., 2 meters).

According to certain embodiments, the processor 120 or 411 may transmit/receive a signal for ranging through a short-range communication network such as a UWB communication network between the electronic device and an external electronic device, measure the relative distance and/or location between the electronic device and the external electronic device using transmission and/or reception time information of the transmitted/received UWB signal, and identify whether or not a specified location condition is satisfied.

According to certain embodiments, based on detecting that specified location condition of the electronic device is satisfied (e.g., such as detecting distance using, a UWB signal between the electronic device and the external electronic device), the processor 120 or 411 may identify information relevant to requesting a specified service from the external electronic device in operation 503. For example, the specified service may include a payment service, access permission, check-in for a ship or airplane, a reservation vehicle use service, or a reservation accommodation use service. For example, the utilized information may be login information for the use of the service desired by the user, and may include personal identity information such as date of birth information, name, resident registration number, passport number, and driver's license acquisition date or expiry date, etc. For example, in a case where the user wishes to purchase items prohibited for sale to minors at a convenience store, such as liquor, the relevant information herein may be date of birth, which may be used to verify the user is of sufficient adult age According to certain embodiments, at least one or more pieces of utilized identity information may be identified by the processor 120 or 411, based on a service provided through the external electronic device. For example, the processor may identify the service provided by the external electronic device, based on a signal received from the external electronic device, and identify utilized information for provision of the service.

According to certain embodiments, at least one or more pieces of utilized identity information may be identified through an authentication information request signal received from the external electronic device. For example, in the case where the external electronic device is a POS payment terminal located at a convenience store, the processor 120 or 411 may identify that the utilized identity information is the date of birth information, based on an adult authentication request received from the POS payment terminal.

According to certain embodiments, if a request for the utilized identity information is received from the external electronic device or if the electronic device approaches the external electronic device within a specified distance for a service provided from the external electronic device, the processor 120 or 411 may provide a user notification (e.g., a push notification) through, for example, a touch screen (e.g., the touch screen 414 in FIG. 4) display of the electronic device, based on the above.

Figure 6A:
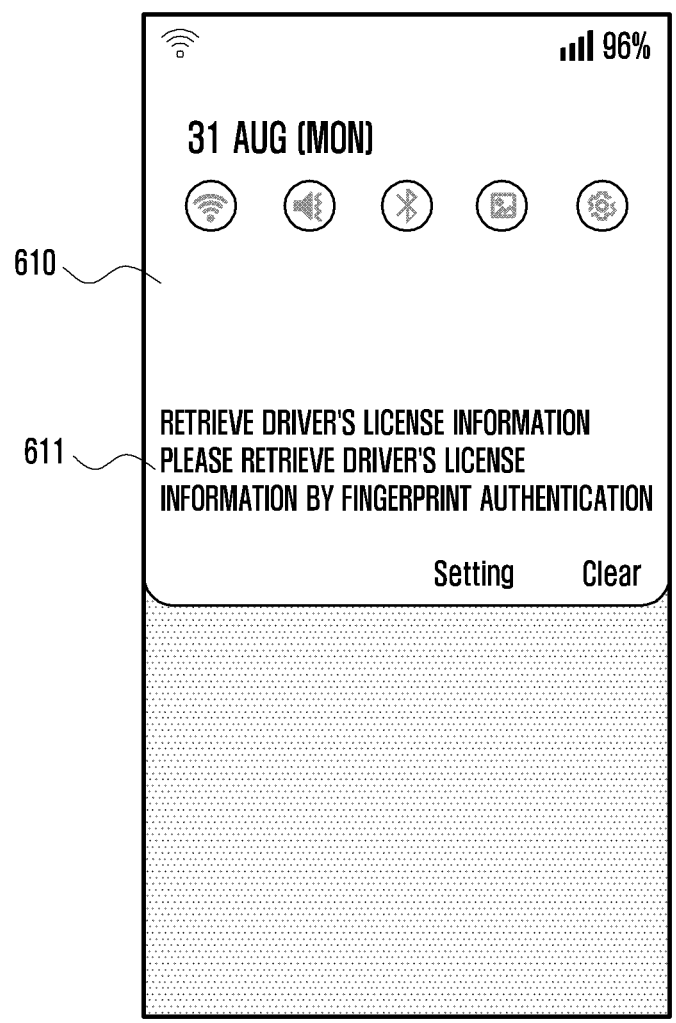
FIGS. 6A and 6B are diagrams illustrating a notification operation of an electronic device according to certain embodiments.
Figure 6B:
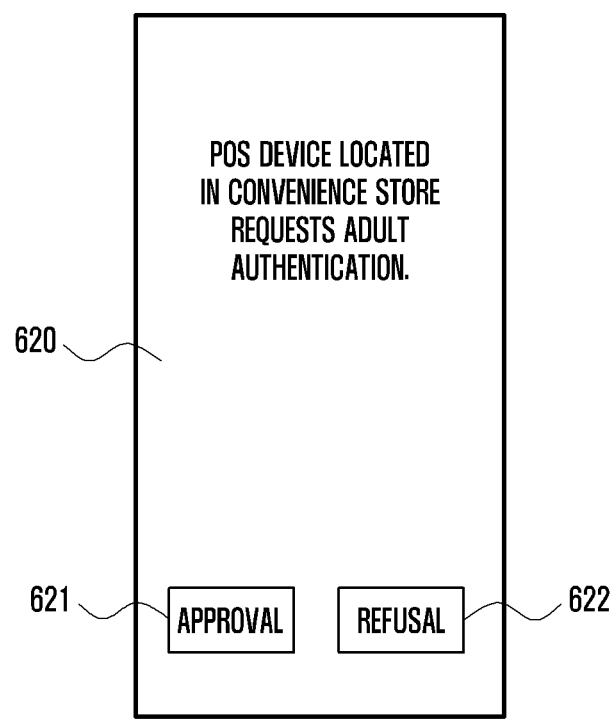

FIGS. 6A and 6B are diagrams illustrating a notification operation of an electronic device according to certain embodiments.

FIG. 6A is a screen illustrating an example of a notification for user identification in the case where an electronic device (e.g., the electronic device 101 or 410 in FIG. 1 or FIG. 4) according to certain embodiments approaches an external electronic device (e.g., the external electronic device 420 in FIG. 4) within a specified distance to receive a service provided by the external electronic device. Referring to FIG. 6A, a processor (e.g., the processor 120 or 411 in FIG. 1 or FIG. 4) may indicate identity information utilized for providing a service from the external electronic device through, for example, a notification window 610 on a touch screen of the electronic device (e.g., accessed by a drag down from a top of the screen) so that the user may be informed of the requisite identity information for accessing the service of the external electronic device, and determine whether or not to provide the same. For example, if a guide window 611 for identity information utilized for provision of a service is selected in the top-down notification window 610 in FIG. 6A, the screen may switch to a user authentication screen to be described later. Referring to FIG. 6B, the processor 120 or 411 may display, for example, a pop-up notification 620 on the touch screen of the electronic device for a specified period of time (e.g., 5 seconds) so that the user may identify the content of the identity information utilized for provision of a service (e.g., an adult authentication request) together with, for example, identification information about the external electronic device providing the service (e.g., a point-of-sale "POS" terminal located at a convenience store) and select approval (e.g., touch an approval button 621) or refusal (e.g., touch a refusal button 622). For example, if approval 621 to provide identity information utilized for provision of a service is selected in the pop-up window 620 in FIG. 6B, the screen may switch to a user authentication screen to be described later.

According to certain embodiments, in addition to output of the message through the top-down notification window or pop-up notification window described above, the processor 120 or 411 may further provide, for example, vibration or sound (e.g., ring tone) in the user notification operation.

According to certain embodiments, in the case where notification is configured as not to provide a user notification in a setting for a specified application (e.g., a payment application), the processor 120 or 411 may omit the user notification even when, for example, a UWB signal including a specified device identifier (e.g., a USSID) related to the corresponding application is received.

According to certain embodiments, in order to provide at least some identity information utilized for the user requesting the service from the external electronic device, in operation 505, the processor 120 or 411 may determine whether or not the user who wishes to receive the service is authenticated for the service. For example, in order to obtain the user's identity information (e.g., the digital ID information that is bound to biometric information and stored in the secure element 213 or 413 in FIG. 2 or FIG. 4), the processor 120 or 411 may access the secure element storing the corresponding information. The access to the secure element may be allowed for the user who is authenticated and obstructed for a user who is not authenticated. For example, authentication of the user's biometric information.

According to certain embodiments, the processor 120 or 411 may output a guide for receiving an input of user authentication information (e.g., a variety of biometric information including fingerprint information, iris information, and/or face information, passwords, or password patterns) for user authentication through, for example, the touch screen (e.g., the touch screen 414 in FIG. 4).

Figure 7A:
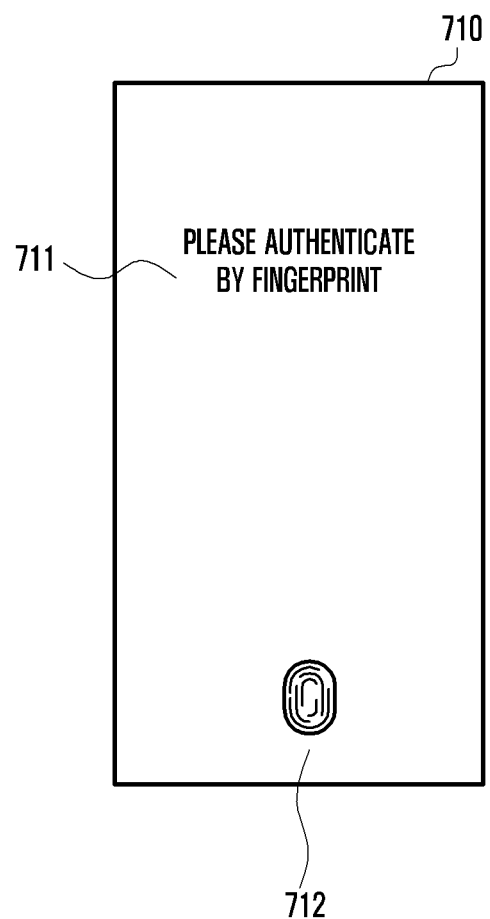
FIGS. 7A to 7C are diagrams illustrating a user authentication operation of an electronic device according to certain embodiments.
Figure 7B:
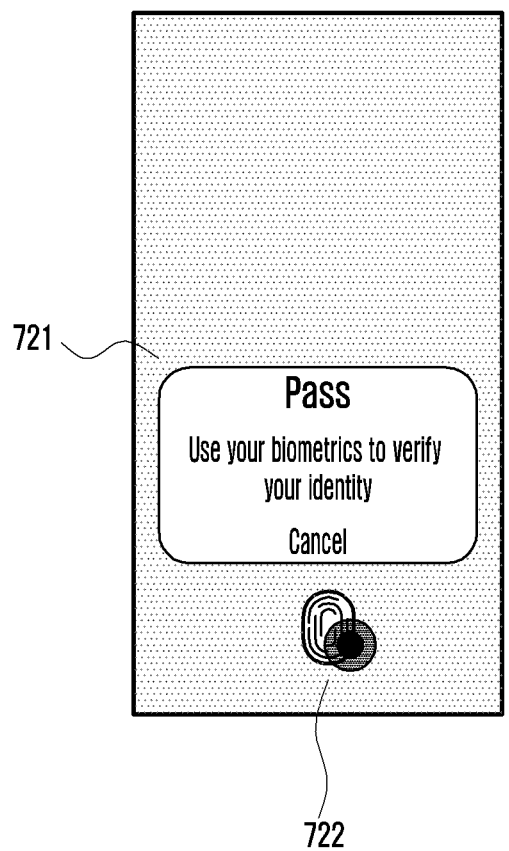
Figure 7C:
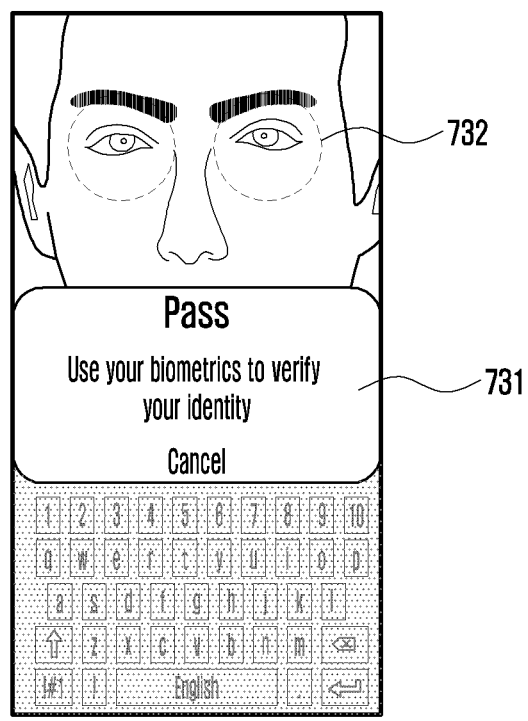

FIGS. 7A to 7C illustrate an example of a guide screen for inputting biometric information for user authentication of an electronic device according to certain embodiments. Referring to FIG. 7A, a processor (e.g., the processor 120 or 411 in FIG. 1 or FIG. 4) of an electronic device (e.g., the electronic device 101 or 410 in FIG. 1 or FIG. 4) according to certain embodiments may output a screen 710 displaying, for example, text 711 prompting input of a fingerprint input by the user and an image 712 indicating a fingerprint input position through the touch screen. Referring to FIG. 7B, the processor 120 or 411 may output, for example, text 721 for prompting input of a fingerprint input by the user and an image 722 indicating a fingerprint input position to the touch screen through an application (e.g., a payment app) activated to perform a service to be provided from the external electronic device. Referring to FIG. 7C, the processor 120 or 411 may output, for example, a guide screen displaying text 731 prompting input of iris information by the user, and an image 732 providing guidance for the same through the touch screen.

According to certain embodiments, the processor 120 or 411 may authenticate the user, based on input user authentication information. For example, the processor 120 or 411 may compare the input user authentication information (e.g., fingerprint information or iris information) with stored user authentication information (e.g., fingerprint information or iris information), and if they match each other, the user authentication is successful, thereby obtaining at least some utilized identity information from the stored digital ID.

According to certain embodiments, in operation 507, the processor 120 or 411 may transmit at least some identity information utilized by the external electronic device to an authentication server (e.g., the authentication server 430 in FIG. 4) through, for example, a second network (e.g., a long-range communication network such as a legacy cellular network, a 5G network, a next-generation communication network, the Internet, or a computer network (e.g., LAN or WAN)), and provide authentication information received from the authentication server to the external electronic device. For example, the authentication information received from the authentication server may include information (e.g., address information such as URL and/or a one-time token) utilized to access the authentication server and to obtain an authentication result for at least one piece of utilized identity information.

Figure 8A:
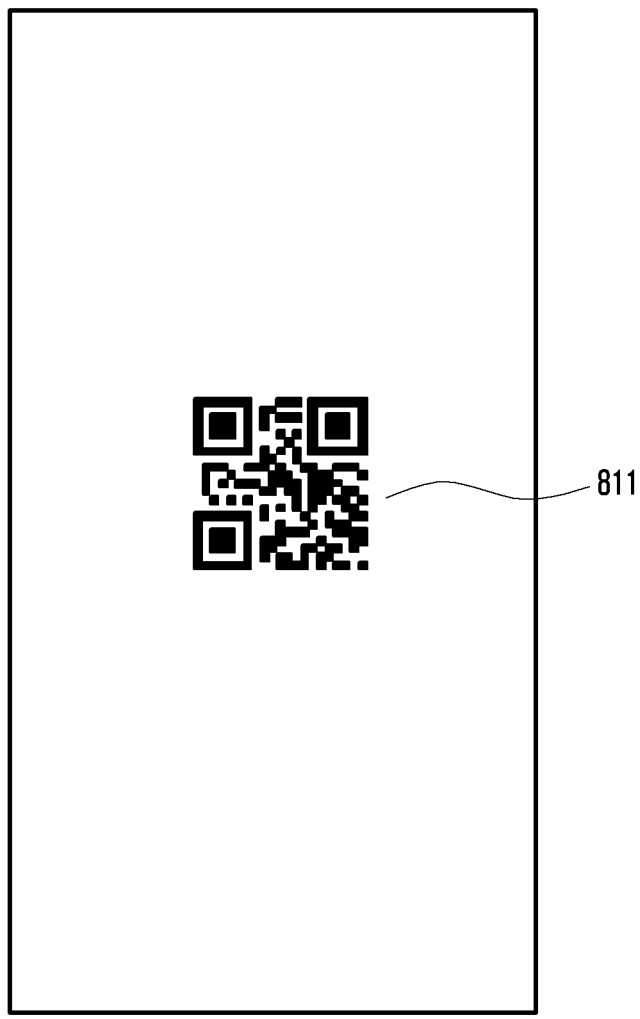
FIGS. 8A to 8C are diagrams illustrating an operation of providing identity information by an electronic device according to certain embodiments.
Figure 8B:
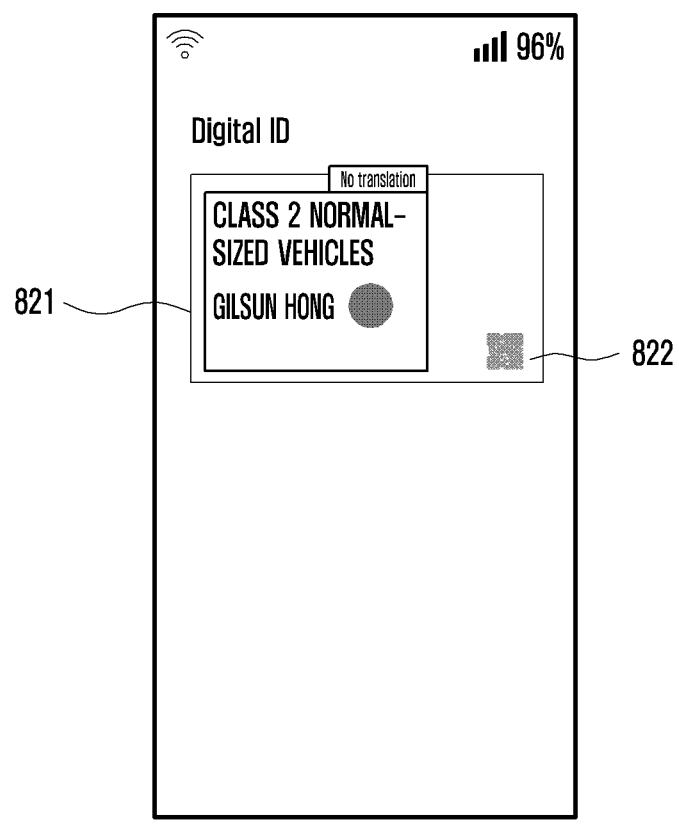
Figure 8C:
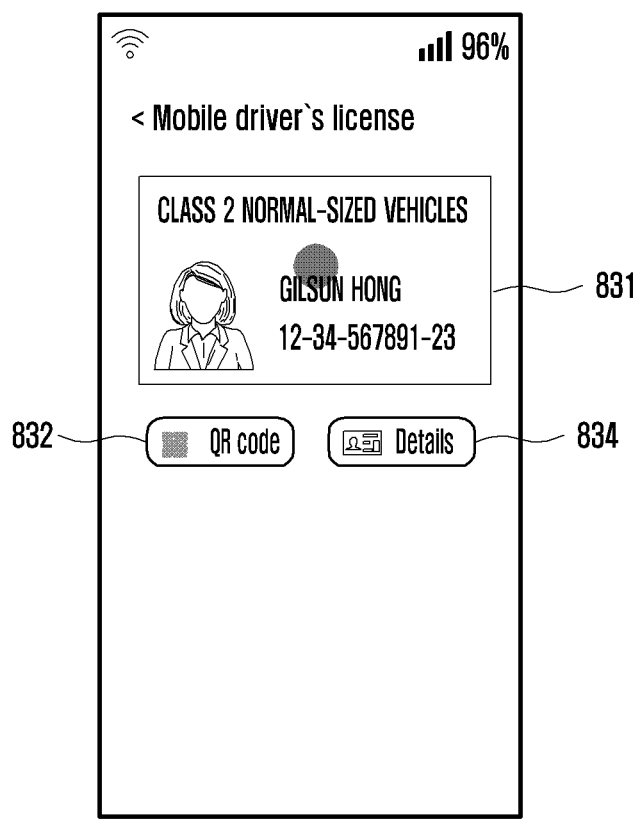

FIGS. 8A to 8C are diagrams illustrating an operation of providing identity information of an electronic device according to certain embodiments.

Referring to FIG. 8A, a processor (e.g., the processor 120 or 411 in FIG. 1 or FIG. 4) of an electronic device (e.g., the electronic device 101 or 410 in FIG. 1 or FIG. 4) according to certain embodiments may produce encrypted data (e.g., barcodes or QR codes) based on the information received from an authentication server and transmit the same to the external electronic device. For example, the processor 120 or 411 may produce a QR code 811 from address information and token information (or token information) received from the authentication server and display the same on the touch screen of the electronic device, as shown in FIG. 8A, so that the external electronic device may scan the QR code.

According to certain embodiments, if the token received by the processor 120 or 411 includes information (e.g., time stamp) indicating a validity period, time information related to the validity period may be displayed on the touch screen together with the QR code 811. Although not shown in FIG. 8A, for example, the processor 120 or 411 may set a timer, based on the validity period, and provide the remaining time of the timer in real time through the touch screen. Alternatively, the processor 120 or 411 may display a time bar corresponding to a specified time of the timer, and provide a time lapse process of the time bar in real time through the touch screen.

Referring to FIGS. 8B and 8C, the processor 120 or 411 may provide at least some identity information utilized by the external electronic device through a setting menu screen for setting personal information including a digital ID. For example, the processor 120 or 411 may provide a personal information setting menu screen to enable access to a password or other personal information including the digital ID stored in the secure element. For example, the processor 120 or 411 may provide a personal information setting menu screen shown in FIG. 8B to a user for which authentication is already completed, and the personal information setting menu screen may display digital ID information 821 including at least some information included in the digital ID, and a code selection button 822 selectable to provide the displayed identity information. For example, if the code selection button 822 is selected on the personal information setting screen, the processor 120 or 411 may output a QR code 811, as shown in FIG. 8A, based on the address and/or token information received from the authentication server, through the touch screen in order to provide some identity information included in the digital ID information 821. FIG. 8C illustrates an example detailed digital ID setting screen that may be displayed when, for example, the digital ID information 821 is selected from the personal information setting menu screen in FIG. 8B. For example, the detailed digital ID setting screen in FIG. 8C may include an area 831 for displaying at least some of the digital ID information, a code selection button 832 selectable to provide some displayed identity information via a displayed QR code, and a detailed information button 834 selectable to identify detailed identity information (e.g., photo, name, date of birth, identification card number, issuing organization, and expiry date) from the digital ID information. For example, the area 831 for displaying some identity information among the digital ID information may include an image including rough identity information of the user (e.g., photo, name, and license number). For example, when the code selection button 832 is selected on the detailed digital ID information setting screen, the processor 120 or 411 may output a QR code 811 shown in FIG. 8A, based on the address and/or token information received from the authentication server, through the touch screen in order to provide some identity information displayed in the area 831.

According to certain embodiments, the external electronic device may extract an address and/or token from the information, for example, a scanned QR code, obtained through the electronic device and transmit the extracted address and/or token to a service server (e.g., the service server 440 in FIG. 4), thereby requesting authentication of at least some identity information utilized for the user of the electronic device. For example, the service server may access the authentication server using the address and/or token and identify an authentication result for at least some identity information of the user. For example, the authentication result may be information indicating whether or not at least some identity information of the user has been authenticated (e.g., that the user has a driver's license, that the user's name and ID match the name and ID of a presented list, or that the user is an adult).

Figure 9:
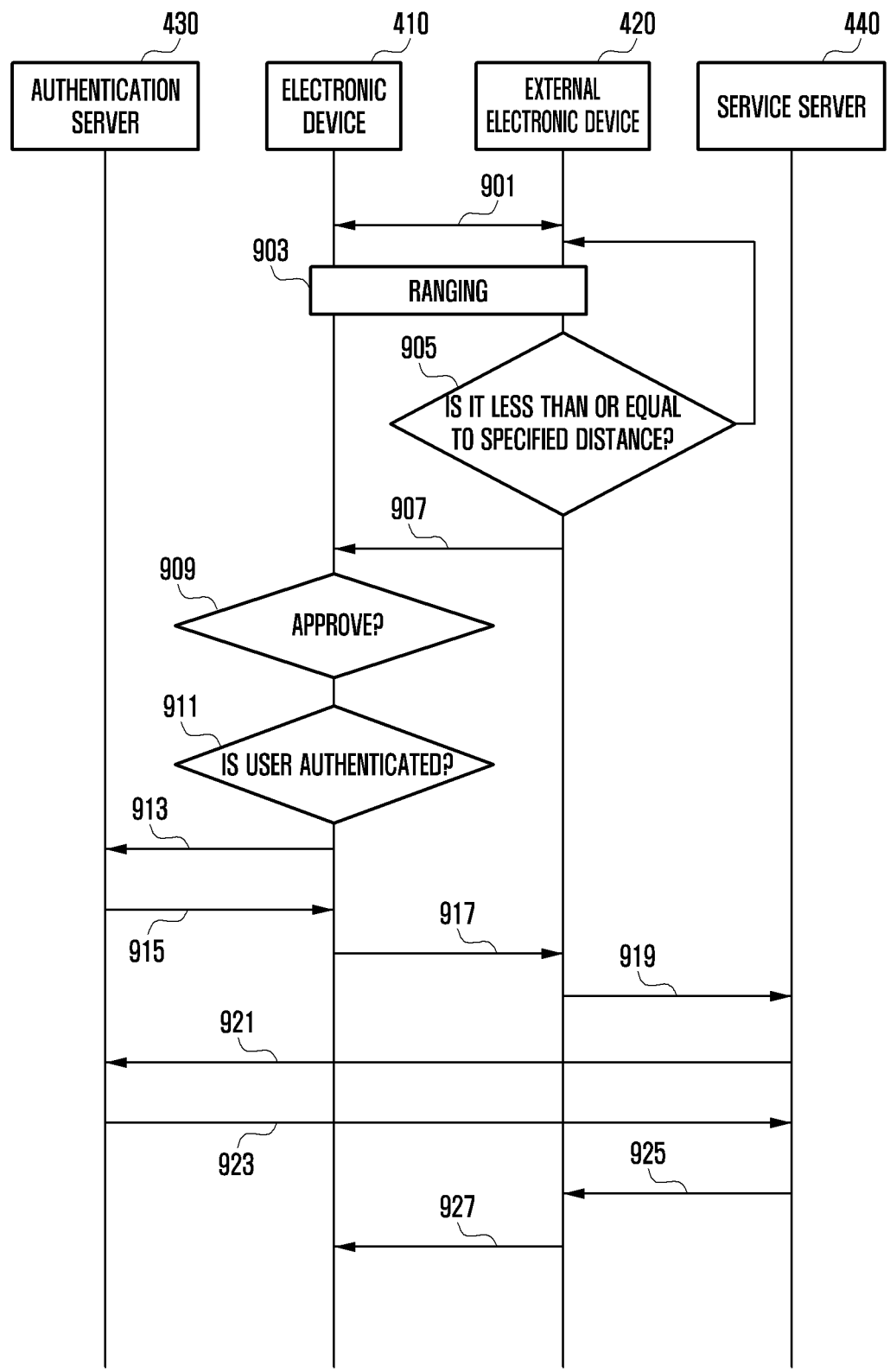
FIG. 9 is a signal flowchart illustrating a method of confirming digital ID information of an electronic device according to certain embodiments.

FIG. 9 is a signal flowchart illustrating a method of confirming digital ID information of an electronic device according to certain embodiments.

According to certain embodiments, in operation 901, an electronic device (e.g., the electronic device 101 or 410 in FIG. 1 or FIG. 4) may communicate with an external electronic device (e.g., the external electronic device 420 in FIG. 4) through, for example, a first network (e.g., a short-range communication network such as UWB (ultra-wide band), Bluetooth, WiFi (wireless fidelity) direct, or IrDA (infrared data association)). For example, the electronic device 410 may exchange parameters for UWB communication with the external electronic device 420 through the first network and, based on the same, transmit and receive UWB signals, thereby connecting a UWB communication network. For example, the UWB signal may include a signal having a frequency band of about 500 MHz or more. For example, the UWB signal may include a signal whose bandwidth is equal to or greater by about 20% than the center frequency of the UWB signal.

According to certain embodiments, in operation 903, the electronic device 410 may perform a ranging operation based on UWB communication with the external electronic device 420. The UWB signal has characteristics similar to those of an impulse signal in the time domain, and thus the electronic device 410 may perform the ranging operation with the external electronic device 420 using the UWB signal. For example, the electronic device 410 may execute ranging using a UWB signal received from the external electronic device 420 and measure its own location information. For example, the electronic device 410 may measure a distance between the electronic device 410 and the external electronic device 420 using time information (e.g., time stamp information) included in the UWB signal received from the external electronic device 420. For example, the external electronic device 420 may execute ranging using a UWB signal received from the electronic device 410, relative to its own location, and thus detect the location of the electronic device 410 and/or the distance to the electronic device 410.

According to certain embodiments, in operation 905, the electronic device 410 may identify whether the distance from the external electronic device 420 is less than or equal to a specified distance, based on the ranging. For example, in operation 905, the external electronic device 420 may identify whether the distance to the electronic device 410 is less than or equal to a specified distance, and, if the distance is less than or equal to the specified distance, transmit a signal for requesting user authentication for providing a service in operation 907.

According to certain embodiments, the electronic device 410 may receive a signal for requesting user authentication from the external electronic device 420 in operation 907, and may identify at least one piece of identity information utilized for user authentication, and determine whether or not to approve provision of the at least one piece of identified identity information in operation 909. For example, at least one piece of utilized identity information may be identified from a user authentication request signal received from the external electronic device 420. For example, at least one piece of utilized identity information may be identified based on the service to be provided through the external electronic device 420. For example, the service to be provided may include a payment service, access permission, check-in for a ship or airplane, a reservation vehicle use service, or a reservation accommodation use service, and at least one piece of identity information utilized to receive the service may include, for example, at least one or more among the personal identity information such as date of birth information, name, resident registration number, passport number, and driver's license acquisition date or expiry date. For example, approval for providing the at least one piece of identified identity information may include approval by the user, based on the user notification provided through the electronic device 410. For example, whether or not to approve the provision of the at least one piece of identified identity information may be omitted.

According to certain embodiments, in operation 911, the electronic device 410 may attempt to authenticate the user, in preparation for providing the at least one piece of identified identity information. For example, user authentication may involve determining whether the user has rightful authority to use or share the at least one piece of identity information to be provided. For example, user authentication may include authentication of authority for accessing a secure element (e.g., the secure element 213 or 413 in FIG. 2 or FIG. 4) to obtain identity information included in the digital ID information of the user. For example, user authentication may be performed based on the user authentication information (e.g., a variety of biometric information including fingerprint information, iris information, and/or face information, passwords, or password patterns) input through the electronic device 410.

According to certain embodiments, when the user authentication is completed in operation 911, the electronic device 410 may transmit a signal including at least some identity information utilized by the external electronic device 420 to an authentication server (e.g., the authentication server 430 in FIG. 4) to request authentication in operation 913, and receive a signal including authentication information for the at least some identity information from the authentication server 430 in operation 915. For example, the authentication server 430, based on device identification information included in the signal received from the electronic device 410, may perform authentication for the at least some identity information, either by its own operations, or by interworking with another verification server (e.g., the verification server 230 in FIG. 2). For example, if authentication for the at least some identity information is successful, the authentication server 430 may store the at least some identity information in a specified address, produce a one-time token for identifying the at least some identity information, and transmit, to the electronic device 410, the token, as authentication information, with or without the address.

According to certain embodiments, the electronic device 410 may generate encrypted data (e.g., barcodes or QR codes) based on the information received from the authentication server 430 and transmit the same to the external electronic device 420 in operation 917. For example, the electronic device 410 may generate and output a QR code (e.g., the QR code 811 in FIG. 8A) from the address information and token information (or the token information) received from the authentication server 430, thereby providing the same to the external electronic device 420.

According to certain embodiments, in operation 919, the external electronic device 420 may transmit a signal including the information (e.g., the address and/or token) obtained through the electronic device 410 to a service server (e.g., the service server 440 in FIG. 4) to request authentication of at least some identity information utilized for the user of the electronic device.

According to certain embodiments, in operation 921, the service server 440 may transmit a signal including the corresponding address and/or token to the authentication server 430 to request authentication for at least some identity information utilized for the user of the electronic device 410.

According to certain embodiments, the authentication server 430 may identify an authentication result for at least some stored identity information, based on the corresponding address and/or token, and transmit a signal including the authentication result to the service server 440 in operation 923.

According to certain embodiments, the service server 440 may transmit the authentication result received from the authentication server 430 to the external electronic device 420 in operation 925.

According to certain embodiments, the external electronic device 420 may transmit a signal indicating provision or rejection the provision of the requested service to the electronic device 410, according to the identity information has been authenticated, according to the authentication result received from the service server 440 in operation 927. For example, if authentication that the user is an adult fails, according to the authentication result, the external electronic device 420 (e.g., a POS device at a convenience store) may reject approving issuance of payment for liquor at a POS terminal.

Figure 10:
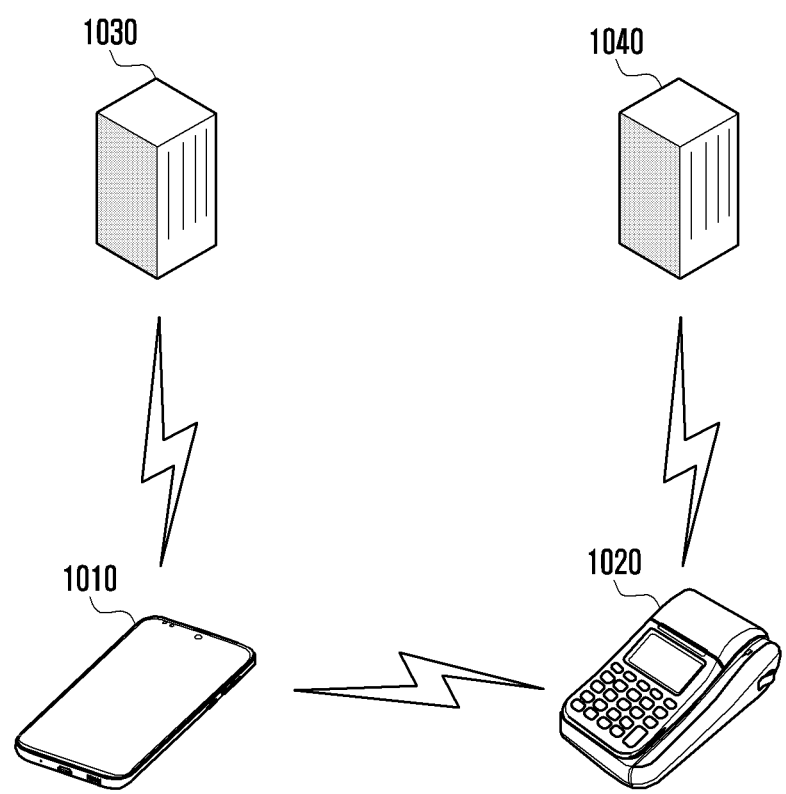
FIGS. 10 to 12 are diagrams illustrating various examples of confirming digital ID information of an electronic device according to certain embodiments.
Figure 11:
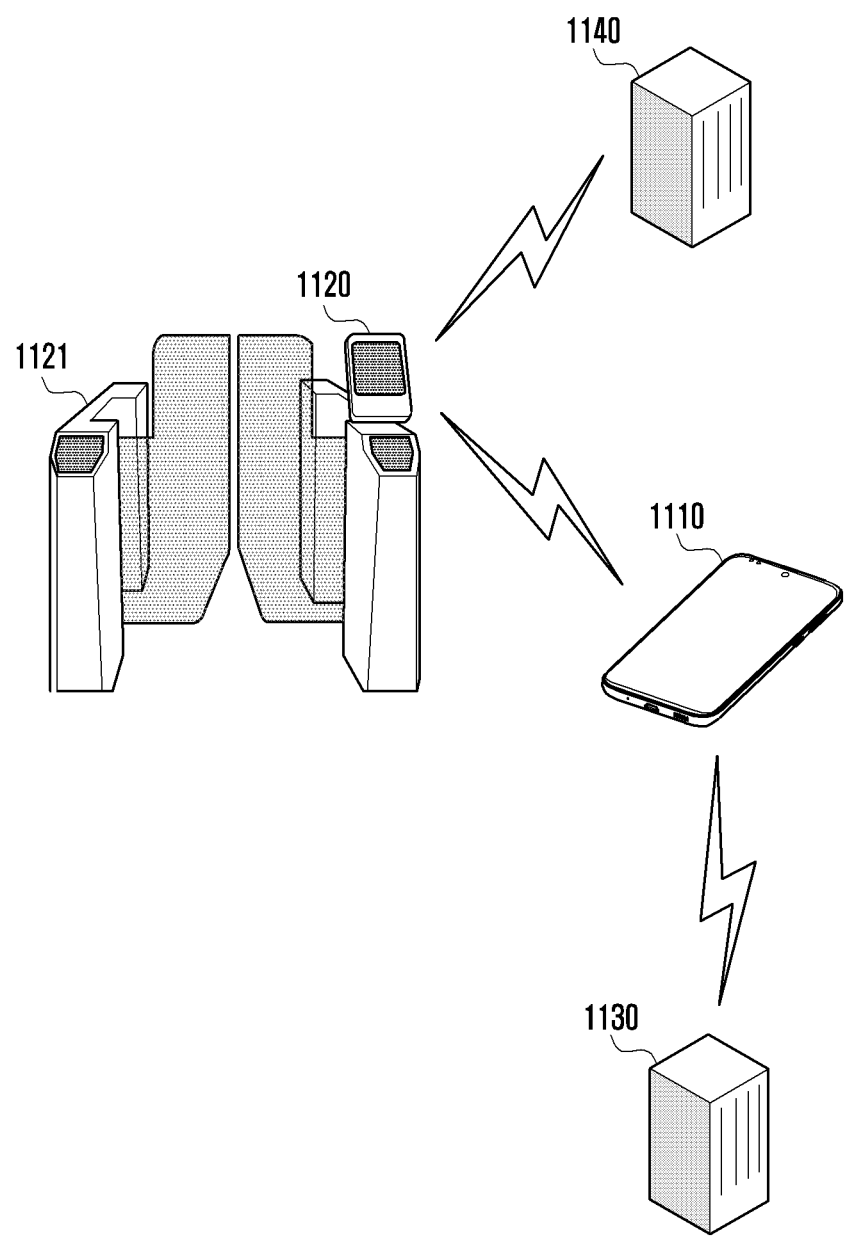
Figure 12:
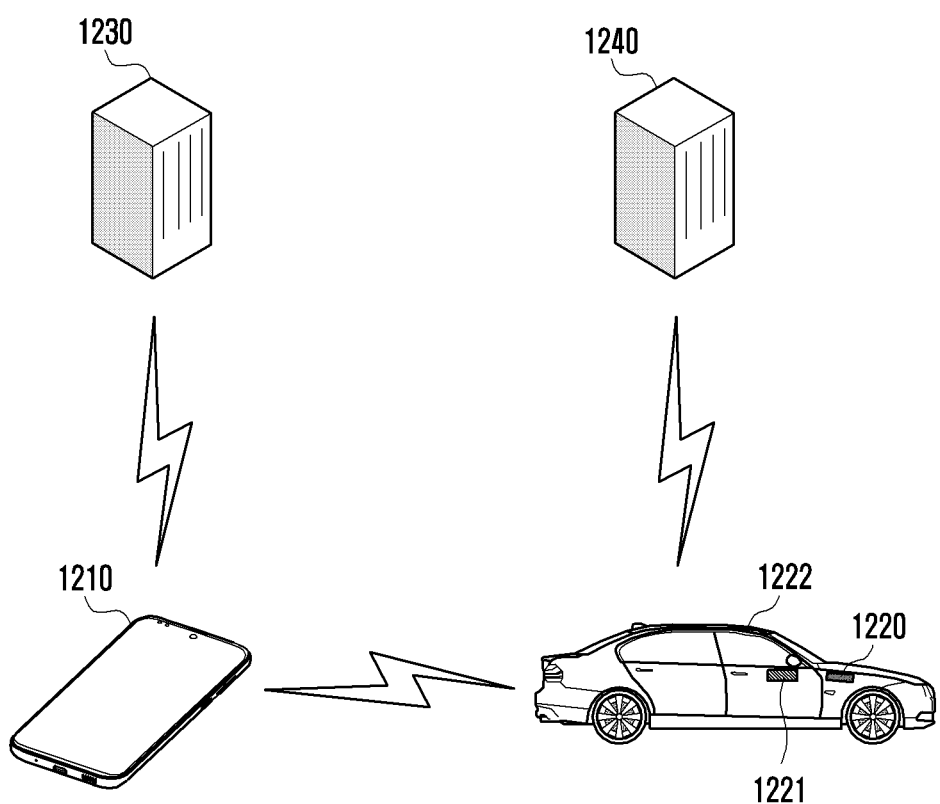

FIGS. 10 to 12 are diagrams illustrating various examples of confirming digital ID information of an electronic device according to certain embodiments.

Referring to FIG. 10, in the case where, for example, in the case where a user operating an electronic device 1010 (e.g., the electronic device 410 in FIG. 4) desires to execute a payment service at a convenience store POS terminal 1020 (e.g., the external electronic device 420 in FIG. 4) to purchase liquor or cigarettes, the convenience store POS terminal 1020 may transmit, for example, a push notification to the electronic device 1010 to prompt a request to authenticate that the user is an adult of sufficient age for the purchase, when the electronic device 1010 approaches the same within a specified distance.

For example, the user may agree to provide identity information (e.g., date of birth) utilized for adult authentication through the electronic device 1010, and execute authentication determining whether or not the user is a rightful person to provide the corresponding identity information, by inputting, for example, biometric information to the electronic device 1010. For example, if the user's biometric authentication is successful, the electronic device 1010 may transmit the requested identity information for adult authentication, as retrieved from the digital ID information stored in the electronic device 1010, to an authentication server 1030 (e.g., the authentication server 430 in FIG. 4). For example, the authentication server 1030 may perform authentication for the corresponding identity information and transmit authentication information including an address and/or token for the authentication result to the electronic device 1010.

For example, the electronic device 1010 may transmit the authentication information including the address and/or token received from the authentication server to the convenience store POS device 1020. For example, the convenience store POS device 1020 may transmit the corresponding address and/or token to a payment server 1040 (e.g., the service server 440 in FIG. 4). Based on the received address and/or token, the payment server 1040 may access the authentication server 1030, obtain an authentication result for the identity information utilized for adult authentication of the user, and provide the same to the convenience store POS device 1020. For example, if it is authenticated that the user of the electronic device 1010 is an adult according to reception of the authentication result, the convenience store POS device 1020 may approve payment for liquor or cigarettes by interworking with the payment server 1040.

Referring to FIG. 11, an example is illustrated in which a user equipped with an electronic device 1110 (e.g., the electronic device 410 in FIG. 4) approaches a gate 1121 in order to board an airplane or ship at the airport or port. For example, an access control device 1120 (e.g., the external electronic device 420 in FIG. 4) installed at the gate 1121 may transmit a push notification to the electronic device 1110 to request authentication that the user is a valid passenger, when the electronic device 1110 approaches the access control device 1120 within a specified distance.

For example, the user may agree to provide identity information (e.g., name, resident registration number, and/or passport number) utilized for passenger authentication through the electronic device 1110, and execute authentication determining whether the user is a rightful person to provide the corresponding identity information. Authentication may be performed by the user inputting, for example, biometric information to the electronic device 1110. For example, if the user's biometric authentication is successful, the electronic device 1110 may transmit the requested identity information utilized for passenger authentication, among the digital ID information stored in the electronic device 1110, to an authentication server 1130 (e.g., the authentication server 430 in FIG. 4). For example, the authentication server 1130 may perform authentication for the corresponding identity information, and transmit authentication information including an address and/or token for the authentication result to the electronic device 1110.

For example, the electronic device 1110 may transmit the authentication information including the address and/or token received from the authentication server to the access control device 1120. For example, the access control device 1120 may transmit the corresponding address and/or token to an access control server 1140 (e.g., the service server 440 in FIG. 4) at the airport or port. Based on the received address and/or token, the access control server 1140 may access the authentication server 1130, and obtain an authentication result indicating whether or not the user matches the passenger information as specified in a passenger list. In this case, the access control server 1140 may retrieve matching user information from the passenger list using identification information (e.g., subscriber identification information) of the owner of the electronic device 1110 through the access control device 1120, and further provide the corresponding user information to the authentication server 1130. For example, the authentication server 1130 may perform user authentication, based on the address and/or token on the user information, and transmit an authentication result to the access control server 1140. For example, when it is authenticated that the user is a valid passenger through the access control server 1140, the access control device 1120 may open the gate 1121, allowing the user to pass through and board.

Referring to FIG. 12, an example is illustrated in which, for example, a user equipped with an electronic device 1210 (e.g., the electronic device 410 in FIG. 4) books a car 1222 from a car sharing service and enters a specified area (e.g., a parking lot in which the booked car 1222 is parked), or approaches the booked car 1222. For example, if the electronic device 1210 approaches a car control device 1220 (e.g., the external electronic device 420 in FIG. 4) installed in the car 1222 within a specified distance, the car control device 1220 may transmit, for example, a push notification to the electronic device 1210 to request authentication as to the user is a valid renter, and further request authentication as to whether the user has requite credentials (e.g., a driver's license) for operating the corresponding car 1222.

For example, the user may agree to provide identity information (e.g., name, resident registration number, license class, and/or license number) utilized to rent the corresponding car 1222 through the electronic device 1210, and perform authentication to determine whether the user is a rightful person to provide the identity information. This authentication can be executed via the user's inputting of biometric information to the electronic device 1210. For example, if authentication of the user's biometrics is successful, the electronic device 1210 may transmit identity information, among the digital ID information stored in the electronic device 1210, to an authentication server 1230 (e.g., the authentication server 430 in FIG. 4). For example, the authentication server 1230 may perform authentication for the corresponding identity information, and transmit authentication information including an address and/or token for the authentication result to the electronic device 1210.

For example, the electronic device 1210 may transmit the authentication information including the address and/or token received from the authentication server 1230 to the car control device 1220. For example, the car control device 1220 may transmit the corresponding address and/or token to a car sharing server 1240 (e.g., the service server 440 in FIG. 4) that manages the car 1222. Based on the received address and/or token, the car sharing server 1240 may access the authentication server 1230 and obtain an authentication result indicating whether the user is the valid renter of the corresponding car 1222, and additionally, whether the user possesses the appropriate credentials (e.g., a driver's license) to operate the corresponding car 1222. In this case, the car sharing server 1240 may further transmit the information on the person who rented/booked the corresponding car 1222 to the authentication server 1230. For example, the authentication server 1230 may perform identity information authentication based on the information on the person who has booked, and the address and/or token, and transmit an authentication result thereof to the car sharing server 1240. For example, if it is authenticated that the user is indeed the person who has booked the car 1222 and also has an appropriate driver's license through the car sharing server 1240, the car control device 1220 may control to unlock the door 1221, to grant access to the user to operate the car 1222, when the user approaches the door 1221 of the car 1222 and enters a specified distance thereof. For example, the car control device 1220 or the car sharing server 1240 may transmit, for example, information (e.g., a map image) including the location of the car 1222 to the electronic device 1210 of the authenticated user.

The embodiments disclosed in this document are presented only by way of example for easy explanation and understanding of technical content, and are not intended to limit the scope of the technology disclosed in this document. Therefore, the scope of the technology disclosed in this document should be construed to encompass all changes or modifications derived from the technical ideas of certain embodiments disclosed in this document in addition to the embodiments disclosed herein.

The invention claimed is:

1. An electronic device, comprising:
a secure element for storing a digital identification (ID) associated with a user;
a sensor;
wireless communication circuitry configured to communicate with an external device;
at least one processor; and
memory for storing instructions that, when executed by the at least one processor individually or collectively, cause the electronic device to:
receive via the wireless communication circuitry. from an external electronic device. a signal requesting authentication information corresponding to identity information of the user to be utilized for a service in the external electronic device;
authenticate the user based on user information received via the sensor; and
upon successful authentication of the user based on the user information,
enable access to the secure element and retrieve the identity information from the digital ID stored in the secure element,
transmit the identity information to an authentication server,
receive the authentication information for the identity information from the authentication server, and
transmit the authentication information to the external electronic device.

2. The electronic device of claim 1, wherein the instructions that, when executed by the at least one processor, cause the electronic device to:
detect at least one of a location of the electronic device or a distance from the electronic device to the external electronic device, based on a signal received from the external electronic device.

3. The electronic device of claim 1, wherein the identity information utilized for the service is determined based at least in part on detecting that a present location of the electronic device is disposed within a preset area, or detecting that a present distance from the external electronic device is within a preset distance.

4. The electronic device of claim 3, wherein at least one of the location or the distance is detected based on time information included in a signal received from the external electronic device.

5. The electronic device of claim 3, wherein the instructions that, when executed by the at least one processor, cause the electronic device to:
receive an ultra-wide band (UWB) signal including time information from the external electronic device,
wherein at least one of the location or the distance is measured based on the received UWB signal.

6. The electronic device of claim 1, wherein the instructions that, when executed by the at least one processor, cause the electronic device to:

retrieve, from the digital ID, the identity information as a part of user identity information included in the digital ID, and receive the authentication information from the authentication server upon the identity information possesses appropriate credentials for the service provided by the external electronic device.

7. The electronic device of claim 1, further comprising a display, wherein the instructions that. when executed by the at least one processor, cause the electronic device to output a user interface screen that provides guidance for the authentication of the user through the display, according to receiving the signal from the external electronic device.

8. The electronic device of claim 7, wherein the user interface screen includes display of at least one piece of identification information on the external electronic device or the identity information.

9. The electronic device of claim 7, wherein the user interface screen includes display of a guide, the guide including at least one of an image and text providing guidance for inputting the user information through the sensor.

10. The electronic device of claim 1, wherein the authentication information received from the authentication server includes at least one of address information or a one-time token confirming authentication of the identity information.

11. The electronic device of claim 1, wherein the instructions that, when executed by the at least one processor, cause the electronic device to:

encrypt the authentication information and provide the encrypted authentication information to the external electronic device.

12. The electronic device of claim 1, wherein the digital ID is based on a physical identification card of the user, and wherein the instructions that, when executed by the at least one processor, cause the electronic device to:

associate the digital ID issued to biometric information of the user that is input through the sensor, and store the association between the digital ID and the biometric information in the secure element.

13. A method of managing a digital identification (ID) associated with a user and stored in a secure element of an electronic device, the method comprising:

receiving from an external electronic device, via awireless communication circuitry, a signal requesting authentication information corresponding to identity information of the user to be utilized for a service in the external electronic device;

authenticating the user based on user information received via a sensor of the electronic device; and upon successful authentication of the user, enabling access to the secure element and retrieving the identity information from the digital ID stored in the secure element of the electronic device, and transmitting the identity information to an authentication server;

receiving the authentication information for the identity information from the authentication server; and transmitting the authentication information to the external electronic device.

14. The method of claim 13, further comprising:

detecting at least one of a location of the electronic device or a distance to the external electronic device, based on a signal received from the external electronic device, wherein the identity information to be utilized for the service is determined based at least par in on detecting that a present location of the electronic device is disposed within a preset area, or detecting that a present distance from the external electronic device is within a preset distance.

15. The method of claim 14, wherein the at least one of the location or the distance is based on time information included in the signal received from the external electronic device.

16. The method of claim 13, further comprising:

retrieving. from the digital ID. the identity information as a part of user identity information included in the digital ID, and receiving the authentication information from the authentication server upon the identity information possesses appropriate credentials for the service provided by the external electronic device.

17. The method of claim 13, further comprising:

outputting a user interface screen that provides guidance for the authentication of the user through a display, according to receiving the signal from the external electronic device.

18. The method of claim 17, wherein the user interface screen includes display of at least one piece of identification information on the external electronic device or identity information.

19. The method of claim 17, wherein the user interface screen includes display of a guide, the guide including at least one of an image and text providing guidance for inputting of the user information through the sensor.

20. The method of claim 13, wherein the authentication information received from the authentication server includes at least one of address information or a one-time token confirming authentication of the identity information.

* * * * *